(12) United States Patent
Rixon et al.

(10) Patent No.: US 10,400,714 B2
(45) Date of Patent: Sep. 3, 2019

(54) HEAT EXCHANGER WITH ANNULAR COOLANT CHAMBER

(71) Applicant: Senior IP GmbH, Shaffhausen (CH)

(72) Inventors: William Rixon, Bartlett, IL (US); Ryan Collins, Glen Ellyn, IL (US); Edward Buttermore, South Elgin, IL (US)

(73) Assignee: Senior IP GmbH, Schaffhausen (CH)

( * ) Notice: Subject to any disclaimer, the term of this patent is extended or adjusted under 35 U.S.C. 154(b) by 0 days.

(21) Appl. No.: 15/718,881

(22) Filed: Sep. 28, 2017

(65) Prior Publication Data

US 2019/0093605 A1   Mar. 28, 2019

(51) Int. Cl.
*F02M 26/28*     (2016.01)
*F02M 26/32*     (2016.01)
(Continued)

(52) U.S. Cl.
CPC ............ *F02M 26/28* (2016.02); *B23P 15/26* (2013.01); *F02M 26/32* (2016.02); *F28D 7/103* (2013.01);
(Continued)

(58) Field of Classification Search
CPC ........ F02M 26/28; F02M 26/29; F02M 26/32; B23P 15/26; F28D 7/103; F02B 29/0462
(Continued)

(56) References Cited

U.S. PATENT DOCUMENTS

| 4,539,940 A |   | 9/1985 | Young |
|---|---|---|---|
| 5,732,688 A | * | 3/1998 | Charlton ................ F02D 21/08 |
|   |   |   | 123/568.12 |

(Continued)

FOREIGN PATENT DOCUMENTS

| DE | 8319866 U1 | 12/1983 |
|---|---|---|
| DE | 10312788 A1 | 9/2004 |

(Continued)

OTHER PUBLICATIONS

JP2004360471 (Yoshida, Nobuaki) Dec. 24, 2007 (machine translation). [online] [retrieved on Aug. 29, 2018] Retrieved from EPO website (Year: 2007).*

(Continued)

*Primary Examiner* — Mahmoud Gimie
(74) *Attorney, Agent, or Firm* — Greenberg Traurig, LLP

(57) ABSTRACT

A heat exchanger for cooling heated gas using a liquid coolant includes a tubular housing with one or more intake apertures circumferentially spaced around a coolant distribution portion of the housing. A tube retention cap sealedly engages the front end of the tubular housing, and includes at least one gas tube orifice. An annular coolant chamber surrounds the coolant distribution portion, which distributes liquid coolant around the intake apertures and directs coolant into the cavity and within the tubular housing. Positioned within the tubular housing is at least one elongated gas tube, which is sealedly engaged with the tube orifice. Liquid coolant flowing in, through a coolant inlet, is directed around the annular coolant chamber and distributed into the cavity of the tubular housing, immersing the elongated gas tube and facilitating heat exchange from the heated gas flowing through the elongated gas tubes immersed within the liquid coolant.

35 Claims, 12 Drawing Sheets

(51) Int. Cl.
    *B23P 15/26*     (2006.01)
    *F28D 7/10*     (2006.01)
    *F28F 9/02*     (2006.01)
    *F28F 9/18*     (2006.01)
    *F28F 9/22*     (2006.01)
    *F28D 7/16*     (2006.01)
    *F28D 21/00*     (2006.01)

(52) U.S. Cl.
    CPC ........... *F28D 7/16* (2013.01); *F28D 21/0003* (2013.01); *F28F 9/02* (2013.01); *F28F 9/026* (2013.01); *F28F 9/0219* (2013.01); *F28F 9/0246* (2013.01); *F28F 9/0248* (2013.01); *F28F 9/0278* (2013.01); *F28F 9/18* (2013.01); *F28F 9/22* (2013.01)

(58) Field of Classification Search
    USPC .................................................... 123/568.12
    See application file for complete search history.

(56) References Cited

U.S. PATENT DOCUMENTS

| | | | |
|---|---|---|---|
| 5,915,472 A * | 6/1999 | Takikawa | F28D 7/1607 165/158 |
| 7,255,096 B2 | 8/2007 | Craig et al. | |
| 8,387,684 B2 * | 3/2013 | Capelle | F28D 7/06 165/69 |
| 8,720,119 B2 | 5/2014 | Gaensler et al. | |
| 9,140,217 B2 | 9/2015 | Collins et al. | |
| 2008/0223563 A1 | 9/2008 | Penny et al. | |
| 2010/0051255 A1 * | 3/2010 | Emrich | F28D 7/1684 165/300 |
| 2012/0111529 A1 * | 5/2012 | Oku | C22C 38/001 165/41 |
| 2014/0216423 A1 * | 8/2014 | Mitsubayashi | F28F 19/06 123/568.12 |

FOREIGN PATENT DOCUMENTS

| | | | |
|---|---|---|---|
| FR | 2231931 A1 | 12/1974 | |
| JP | 2004360471 A | * 12/2004 | |

OTHER PUBLICATIONS

International Search Report for PCT/EP2018/073251, dated Nov. 27, 2018.

* cited by examiner

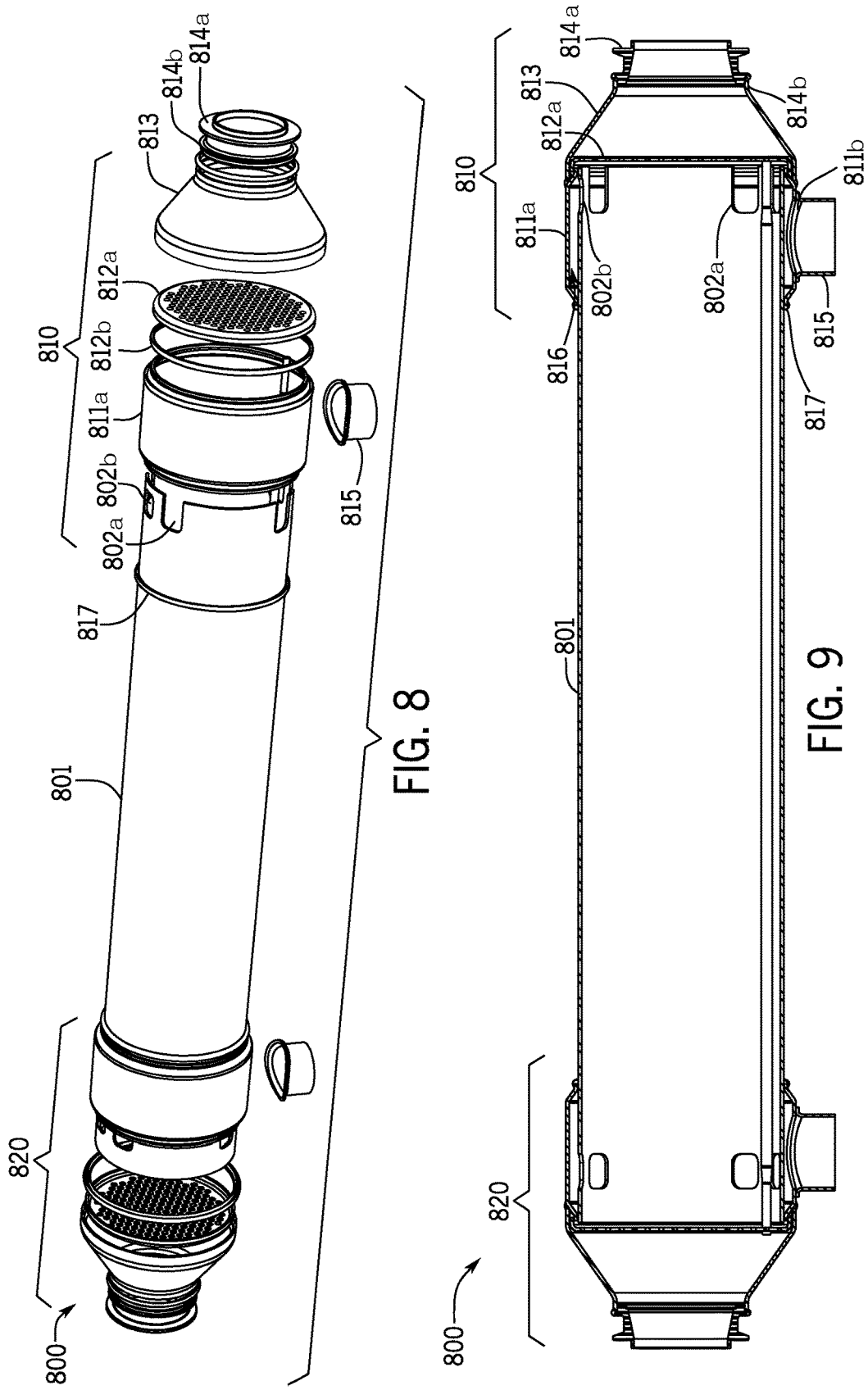

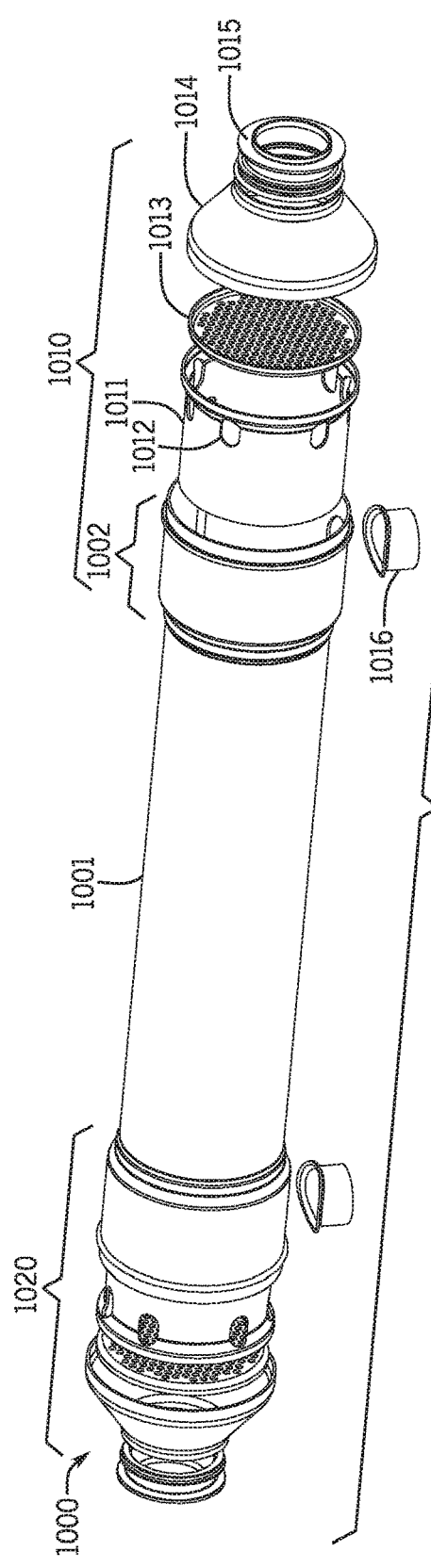
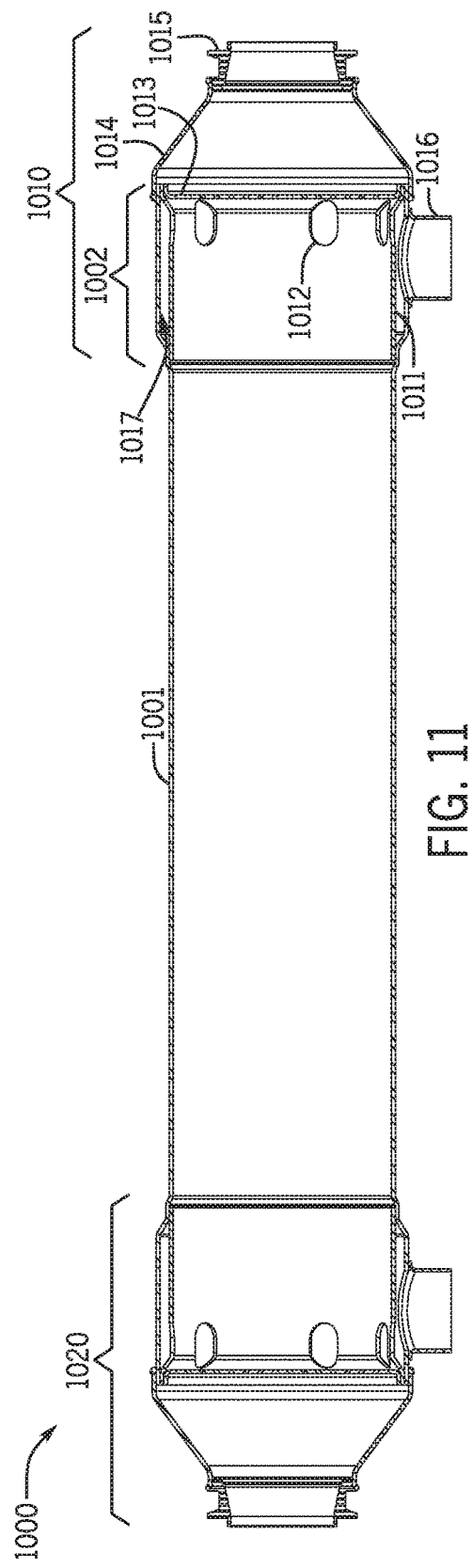
FIG. 10
FIG. 11

HEAT EXCHANGER WITH ANNULAR COOLANT CHAMBER

FIELD OF THE INVENTION

The present invention relates to heat exchangers, and more specifically to heat exchangers with an improved coolant distribution arrangement.

BACKGROUND OF THE INVENTION

Recent developments in internal combustion engine technology have led to less harmful emissions and reduced fuel consumption. Exhaust gas recirculation (EGR)—an emissions reduction technique in which a portion of exhaust gasses are fed back into an engine's combustion chamber—is one such technology that has improved internal combustion efficiency. However, due to the high temperatures and pressures of exhaust gasses from combustion engines, those exhaust gasses must often be cooled prior to being introduced back into the combustion chamber.

Heat exchangers known in the prior art typically include components formed from metal castings. A typical casting process involves pouring hot liquid metal into a mold and waiting for the metal to cool and solidify. One advantage of casting over other metalworking processes is that complex shapes can be formed without having to join or fuse multiple components together. Casted components are often able to withstand high temperatures and pressures, in part because they lack the structural weakness of welds or braze joints.

Although casted metal components tend to be robust and able to withstand harsh temperatures and pressures, they are often not suitable for large-scale production or for manufacturing products with varying specifications. A different casting mold is required for each variant of a product. Additionally, metal casting is a more time-consuming manufacturing process compared to other manufacturing processes. The metal must first be melted into a liquid, which is then poured into the mold and left to cool for a period of time before being removed from the casting.

Furthermore, metal casting often involves using disposable or expendable molds that are destroyed during the casting process. For large-scale production, making new molds for each individual component for each different application can be costly and time consuming. Such inflexibility and inefficiency in the casting process might render the manufacture of certain components infeasible.

It is accordingly an objective of the present invention to produce heat exchangers comprising components formed from more efficient and flexible manufacturing processes, such as stamping and/or extrusion to yield heat exchangers, having effective, if not improved heat exchanger capabilities, over those of casted assemblies.

Heat exchangers, such as coaxial coolers used in EGR systems, may vary in size, height, and placement within an engine or exhaust system. Often times, the space within an engine compartment is limited, such that additional components fitted therein must conform to the available space therein. It is therefore another objective of the present invention to provide heat exchangers that are modular and whose components are capable of being readily adapted to different shapes and sizes.

Some vehicles may be subject to stresses and forces that require their engine components to be secured or mounted within its engine bay. Other engine systems may be compact in size and include components mounted to a frame or body to hold them in place. It is therefore another objective of the present invention to provide heat exchangers with mounting hardware.

Coolers typically immerse one or more small-radius gas tubes in liquid coolant. When heated gas flows through the tubes, the tubes themselves are heated. That heat is exchanged with the liquid coolant, which coolant cycles out of a coolant cavity and is then cooled by a separate device before being introduced back into the cavity.

Coolers known in the prior art typically introduce liquid coolant into a coolant cavity through a single port or aperture. As a result, gas tubes in close proximity to that aperture experience greater amounts of cooling compared to gas tubes further away from the aperture.

It is accordingly an objective of the present invention to improve the distribution, consistency, and efficiency of liquid coolant within a coolant cavity.

These and other objectives and advantages will become apparent from the following detailed written description and figures.

SUMMARY OF THE INVENTION

According to a first aspect of the present invention, there is provided a heat exchanger for cooling heated gas using liquid coolant. The heat exchanger includes a tubular housing having a front end and a rear end, and also includes one or more coolant intake apertures circumferentially spaced within a coolant distribution portion of the tubular housing that is substantially proximate the front end. The tubular housing has one or more walls that at least partially define a cavity. The heat exchanger also includes a tube retention cap that sealedly engages proximate to its front end. The tube retention cap includes at least one gas tube orifice. The heat exchanger further includes an annular coolant chamber surrounding the coolant distribution portion of the tubular housing. The annular coolant chamber is adapted to distribute liquid coolant about a substantial portion of the circumference of the tubular housing, and, in turn around a majority of the one or more coolant intake apertures and to, direct liquid coolant around and through the one or more coolant intake apertures into the cavity of the tubular housing. Alternatively, a single, circumferential slot or elongated apertures may replace the use of one or more smaller apertures. Additionally, the heat exchanger includes a coolant inlet integrated with the annular coolant chamber. The coolant inlet is adapted to receive liquid coolant and to, in turn, direct liquid coolant into and through the annular coolant chamber.

The heat exchanger of the present invention includes at least one elongated gas tube sealedly engaged with and extending from the at least one tube gas orifice into the cavity of the tubular housing toward the rear end. The at least one elongated gas tube is capable of being immersed in liquid coolant within the cavity to facilitate an exchange of heat from heated gas into liquid coolant. The heat exchanger also includes a gas inlet coupler at the front end of the tubular housing, which sealedly covers the front end of the tubular housing over the tube retention cap. The gas inlet coupler is adapted to receive heated gas and to direct heated gas through the at least one gas tube orifice and into the at least one elongated gas tube. The heat exchanger further includes a coolant outlet disposed substantially proximate to the rear end of the tubular housing. The coolant outlet is adapted to receive liquid coolant from within the cavity and to direct liquid coolant through one or more egress apertures disposed substantially proximate to the rear end of the tubular housing to release liquid coolant from the cavity of the tubular housing. Additionally, the heat exchanger also includes a gas outlet coupler at the rear end of the tubular housing, which is adapted to direct cooled gas from the at least one elongated gas tube.

The annular coolant chamber may be formed from a cap assembly that may comprise a flange surrounding the tube retention cap, and an annular ring affixed to an outer surface of the tubular housing. In some embodiments, the flange surrounding the tube retention cap includes an annular ring as an integrated element, for affixation of the integrated element about said outer surface of the tubular housing at a location substantially aligned with the orientation of the one or more coolant intake apertures. Additionally, an alignment bead may be affixed to the outer surface of the tubular housing, serving as a stop against which the integrated element abuts and sealedly engages with. In other embodiments, the cap assembly also includes a retaining wall having a first side and a second said. The retaining wall has positioned therethrough the at least one gas tube orifice, which is capable of allowing gas to pass through the retaining wall from the first side toward the second side and into the at least one elongated gas tube.

In some embodiments, the tube retention cap and the annular coolant chamber may be formed from a cap assembly. In those embodiments, the cap assembly includes a retaining wall and a side wall. The retaining wall has a first side and a second side, and has thereon the at least one tube orifice. The at least one tube orifice is capable of allowing fluid to pass through the retaining wall from the first side to the second side. The side wall has a narrow region and a radially-protruding region. The narrow region is arranged to overlap an outer surface of the tubular housing. The radially-protruding region is arranged to overlap the coolant distribution portion of the tubular housing. An inner surface of the radially-protruding region and the outer surface of the coolant distribution portion of the tubular housing define said annular coolant chamber. The coolant inlet is formed from an opening integrated with the radially-protruding region.

The cap assembly may include a substantially cylindrical bulkhead stamping and a substantially cylindrical transition stamping. The bulkhead stamping includes a narrow section, a tapered section, a wide section, and the retaining wall. The retaining wall is circular in shape and has thereon the at least one tube orifice. The narrow section of the bulkhead stamping is constrained about a second portion of the outer surface of the tubular housing. The transition stamping includes a narrow section, a tapered section, and a wide section. The narrow section of the transition stamping is constrained about a portion of the outer surface of the tubular shell. The wide section of the transition stamping is constrained about the wide section of the bulkhead stamping.

The tube retention cap and the annular coolant chamber may be formed from a cap assembly. The cap assembly may include a retaining wall, a flange surrounding the tube retention cap, and an annular ring affixed to the outer surface of the tubular housing.

The retaining wall includes a first side and a second side, and has formed therethrough, the at least one gas tube orifice. The at least one gas tube orifice is capable of allowing gas to pass through the retaining wall from the first side to the second side and into the at least one gas tube orifice.

The cap assembly may include a substantially cylindrical bulkhead stamping that abuts the outer surface of the tubular housing adjacent to its front end. The bulkhead stamping may be formed by pressing a piece of metal, such as a workpiece, into a die.

The flange and the annular ring of the tube retention cap may collectively define a substantially circular opening into which the coolant inlet is positioned. As one example, a side wall of the transition stamping may include a first substantially semi-circular opening, and a side wall of the bulkhead stamping may include a second substantially semi-circular opening. The first and the second substantially semi-circular openings may be arranged to collectively form the opening through which the liquid coolant flows into the annular coolant chamber.

The coolant inlet ring may be welded to the bulkhead stamping and the transition stamping. In some embodiments, the narrow section of the transition stamping is welded to the outer surface of the tubular housing. In other embodiments, the wide section of the transition stamping is welded to the wide section of the bulkhead stamping.

In some implementations, the cap assembly further includes one or more mounting bosses secured to the bulkhead stamping and the transition stamping. The one or more mounting bosses may be welded to the bulkhead stamping and the transition stamping. Each mounting boss may include therethrough a bore or screw hole configured to engage with a fastener for mounting the heat exchanger into the engine compartment of a vehicle.

The gas inlet coupler may include a substantially frusto-conical diffuser that includes a narrow section, a tapered section, and a wide section. The wide section is constrained about the cap assembly. An inner surface of the diffuser and the outer wall of the cap assembly define a gas inlet chamber for receiving heated gas and directing heated gas into the at least one elongated gas tube. The diffuser may be configured for juxtaposition about the flange surrounding the tube retention cap.

The heat exchanger may also include a circular ring that at least partially surrounds the diffuser. The circular ring is adapted to receive heated gas and to direct heated gas into the gas inlet chamber. The circular ring may, in some implementations, be welded to the diffuser.

With respect to several of the heat exchanger embodiments of the present invention, the heat exchanger includes both an inlet tube retention cap and an outlet tube retention cap, an annular coolant inlet chamber and an annular coolant outlet chamber, a gas inlet coupler and a gas outlet coupler, and a coolant inlet and a coolant outlet. The outlet tube retention cap may be the same as and/or interchangeable with the inlet tube retention cap, in some implementations. Some heat exchangers may include the same components at the rear end as at the front end.

In some implementations, the annular coolant chamber extends around less than the entire circumference of the tubular housing such that the annular coolant chamber forms an arc of less than 360 degrees. In a preferred embodiment of the invention, the annular coolant chamber extends around at least 50%, or at least 180 degrees, of the circumference of the tubular housing.

The one or more intake apertures may be prepositioned in locations around the circumference of the housing so as to optimally distribute liquid coolant, to those tubes requiring a greater cooling immersion. Alternatively, optimal distribution of liquid coolant may be a substantially consistent flow rate of coolant entering the cavity through each of the one or more intake apertures.

According to a second aspect of the present invention, there is provided a heat exchanger for cooling heated gas using liquid coolant. The heat exchanger includes a tubular housing having a front end, a central portion, and a rear end. The tubular housing also includes a coolant distribution portion having both an inner surface and an outer surface. The central portion has a first radius, while the coolant distribution portion has at least a second radius that is larger than the first radius. The tubular housing also has one or more walls that at least partially define a cavity. The heat exchanger also includes a tube retention cap sealedly engaged proximate to the front end of the tubular housing, and including at least one gas tube orifice. The heat exchanger further includes a distribution insert having at least one wall defining an inner surface and an outer surface. The distribution insert includes one or more coolant intake apertures spaced around its circumference. The distribution insert is positioned within the coolant distribution portion of the tubular housing, to create a space between the outer surface of the distribution insert and the inner surface of the coolant distribution portion, forming an annular coolant chamber. The annular coolant chamber is adapted to distribute liquid coolant around and through the one or more coolant intake apertures, into the cavity of the tubular housing.

The heat exchanger according to the second aspect also includes a coolant inlet integrated with the annular coolant chamber, which is adapted to receive liquid coolant and to, in turn, direct liquid coolant into and through the annular coolant chamber. Additionally, the heat exchanger includes at least one elongated gas tube that is sealedly engaged with and extend from the at least one gas tube orifice into the cavity of the tubular housing toward its rear end. The at least one gas tube is capable of being immersed in liquid coolant positioned within the cavity of the tubular housing to facilitate an exchange of heat from heated gas into liquid coolant. Further, the heat exchanger includes a gas inlet coupler at the front end of the tubular housing. The gas inlet coupler sealedly covers the front end of the tubular housing over the tube retention cap, and is adapted to receive heated gas and to, in turn, direct heated gas through the at least one gas tube orifice and into the at least one elongated gas tube. The heat exchanger also includes a coolant outlet disposed substantially proximate the rear end of the tubular housing. The coolant outlet is adapted to receive liquid coolant from within the cavity and to release the liquid coolant from the cavity of the tubular housing. The heat exchanger further includes a gas outlet coupler at the rear end of the tubular housing. The gas outlet coupler is adapted to direct cooled gas from the at least one elongated gas tube, for subsequent use thereof.

According to a third aspect of the present invention, there is provided a method of forming a heat exchanger for cooling heated gas using liquid coolant. The method involves providing a tubular housing having a front end, a rear end, an inner periphery, an outer periphery, and a liquid coolant cavity therewithin. The outer periphery defines a circumference about the tubular housing. The method also involves providing a series of elongated gas tubes extending through the liquid coolant cavity. The method further involves providing an annular coolant inlet chamber about at least a portion of the circumference about the tubular housing proximate the front end.

The heat exchanger formed according to the third aspect of the present invention is configured so as to be capable of distributing liquid coolant through multiple locations from within the annular coolant inlet chamber for entry into the liquid coolant cavity from the front end to the rear end. The heat exchanger is also configured so as to be capable of directing heated gas into the series of elongated gas tubes from the front end to the rear end. The heat exchanger is further configured so as to be capable of exchanging heat from the heated gas toward and into the liquid coolant. Additionally, the heat exchanger is configured so as to be capable of directing cooled gas from the rear end of the tubular housing for subsequent use thereof.

In some embodiments, the multiple locations comprise one or more coolant intake apertures spaced between the annular coolant inlet chamber and the liquid coolant cavity. In these embodiments, the heat exchange is further configured so as to be capable of directing the liquid coolant from within the annular coolant inlet chamber through the one or more coolant intake apertures and into the liquid coolant cavity of the tubular housing.

In some implementations, the coolant intake apertures are formed about the outer periphery of the tubular housing proximate the front end. In other implementations, the method further involves providing a distribution insert, having an inner periphery and an outer periphery, that is positioned within the tubular housing proximate its front end. In such implementations having a distribution insert, the coolant intake apertures may be formed about the outer periphery of the distribution insert. The distribution insert and the tubular housing may collectively define the annular coolant inlet chamber.

The method according to the third aspect may also involve providing an annular coolant chamber proximate the rear end of the tubular housing. In these instances, the heat exchanger may be further configured so as to be capable of collecting warmed liquid coolant from the liquid coolant cavity, and of directing the warmed liquid coolant into the annular coolant outlet chamber. In some implementations, the annular coolant inlet chamber and the annular coolant outlet chamber are interchangeable. Additionally, the tubular housing, the annular coolant inlet chamber, and the annular coolant outlet chamber may each be formed form one or more stamped pieces of metal.

In some implementations, the method further involves forming the tubular housing from one or more pieces of metal through a process of extrusion. Likewise, the formation of the series of elongated gas tubes may involve extruding one or more pieces of metal. In other implementations, the tubular housing and/or the series of elongated gas tubes are each formed from a welded strip of turned metal (e.g., a rectangular metal sheet that is rolled to form a tube).

According to a fourth aspect of the present invention, there is provided method of cooling heated gas in a heat exchanger. The method involves providing a tubular housing defining a front end and a rear end. The method also involves providing heated gas into a gas inlet chamber of the heat exchanger, where the gas inlet chamber sealedly covers the front end of the tubular housing. The method also involves directing the heated gas into at least one elongated gas tube that extends into a cavity at least partially defined by inner walls of the tubular housing. The method further involves providing liquid coolant into an annular coolant chamber of the heat exchanger, where the annular coolant chamber surrounds a coolant distribution portion of the tubular housing that is substantially proximate to the front end. Additionally, the method involves distributing the liquid coolant around one or more intake apertures circumferentially spaced around the coolant distribution portion of the tubular housing. As with the apparatus, the method may likewise rely upon a continuous annular slot, or a single elongated aperture in lieu of one or more smaller apertures.

Further, the method involves directing the liquid coolant through the one or more intake apertures into the cavity of the tubular housing, causing the at least one elongated gas tube to be immersed in the liquid coolant. The liquid coolant in contact with an outer surface of the at least one elongated gas tube facilitates heat exchange from the heated gas to the liquid coolant to produce cooled gas and warmed liquid coolant. The method also involves directing the warmed liquid coolant through one or more egress apertures disposed substantially proximate to a rear end of the tubular housing opposite the front end to release the warmed liquid coolant from the cavity of the tubular housing. The method further involves directing the cooled gas from the at least one elongated gas tube into a gas outlet chamber.

The foregoing summary is illustrative only and is not intended to be in any way limiting. In addition to the illustrative aspects, embodiments, and features described above, further aspects embodiments, and features will become apparent by reference to the figures and the following detailed description and the accompanying drawings.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 8 is an exploded perspective view of another example heat exchanger/cooler of the present invention;

FIG. 9 is an elevated cross-sectional side view of the example cooler according to the embodiment of FIG. 8;

FIG. 10 is an exploded perspective view of another example heat exchanger/cooler of the present invention;

FIG. 11 is an elevated cross-sectional side view of the example cooler according to the embodiment of FIG. 10;

DETAILED DESCRIPTION OF THE EMBODIMENTS

Figure 1A:
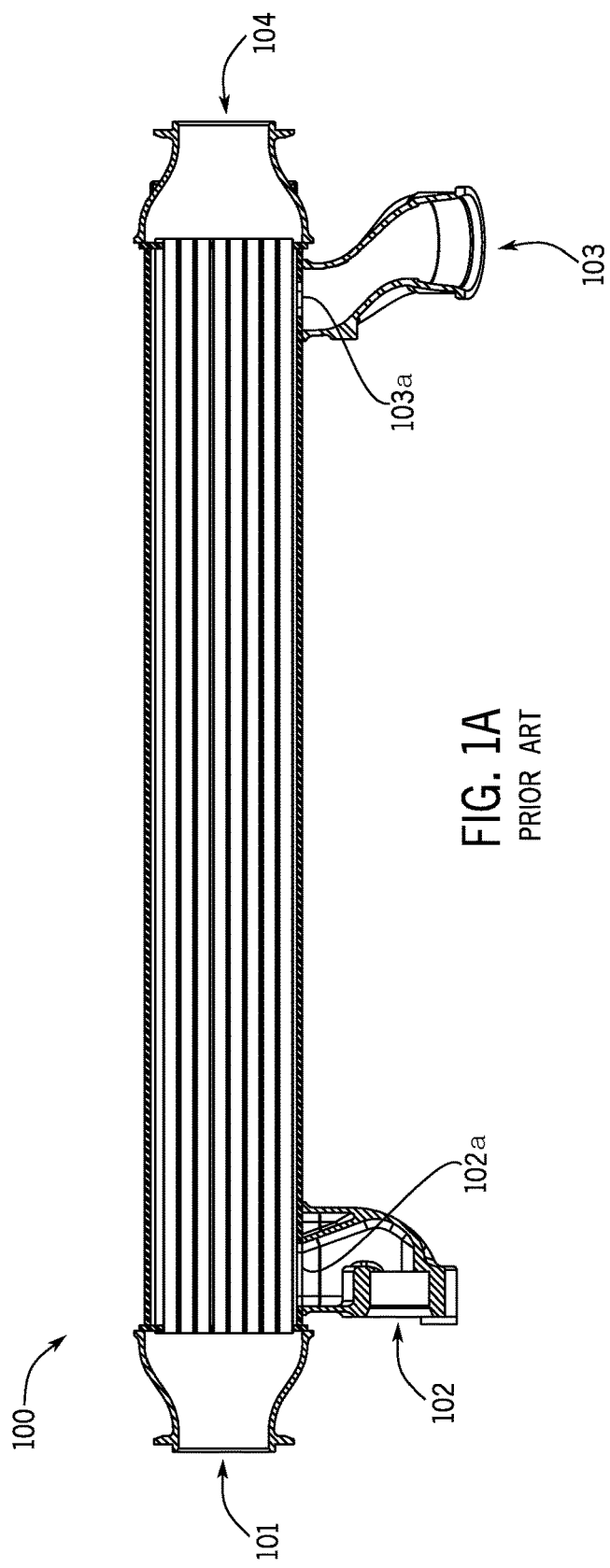
FIG. 1A is an elevated cross-sectional side view of a prior art cooler embodiment.

There will now be described by way of examples, several specific modes of the invention as contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

The present application discloses heat exchangers for transferring heat between a gas and a liquid. In various embodiments, the heat exchangers described are coolers which cool a hot gas using a liquid coolant. It will be understood by one of ordinary skill in the art that a "cooler" is a type of heat exchanger.

A known technique for improving the efficiency of combustion engines involves recirculating a portion of the exhaust gasses back into the combustion chamber, where it mixes with fuel and air and is combusted again. Because combustion exhaust is very hot, these systems typically include a stage in which hot exhaust gas is cooled before being introduced back into the combustion chamber.

One type of exhaust gas cooler operates by exchanging heat from the gas into another medium, such as a liquid coolant. Warmed liquid coolant may be cycled through the system, drawing heat from the gas and itself being cooled through a separate device (e.g., a radiator).

Prior art cooler 100—which is shown in FIGS. 1A-1D—includes gas inlet 101, coolant inlet 102, coolant outlet 103, and gas outlet 104. Gas inlet 101 and gas outlet 104 are substantially coaxially aligned with the cooler's body and gas tubes disposed therein. Coolant inlet 102 and coolant outlet 103 direct liquid coolant into and out of the body through respective apertures at the bottom of the body.

Coolant inlet 102 includes a single inlet aperture 102*a*, through which liquid coolant is directed into the inner cavity of the body of cooler 100. Because cooler 100 includes only the single inlet aperture 102*a*, some of the gas tubes closer to inlet aperture 102*a* (i.e., near the lower end of cooler 100) can experience more cooling than gas tubes farther away from inlet aperture 102*a* (i.e., near the upper end of cooler 100). At the outlet end, prior art cooler 100 includes a single outlet aperture 103*a*, through which liquid coolant is directed out of the inner cavity of the body of cooler 100 and through coolant outlet 103. This arrangement provides a different amount of cooling for gas tubes in close proximity to inlet aperture 102*a* and outlet aperture 103*a* compared to gas tubes far from inlet aperture 102*a* and outlet aperture 103*a*. The uneven distribution of liquid coolant into the inner cavity of the body of cooler 100 facilitates the cooling of the gas tubes.

Figure 1B:
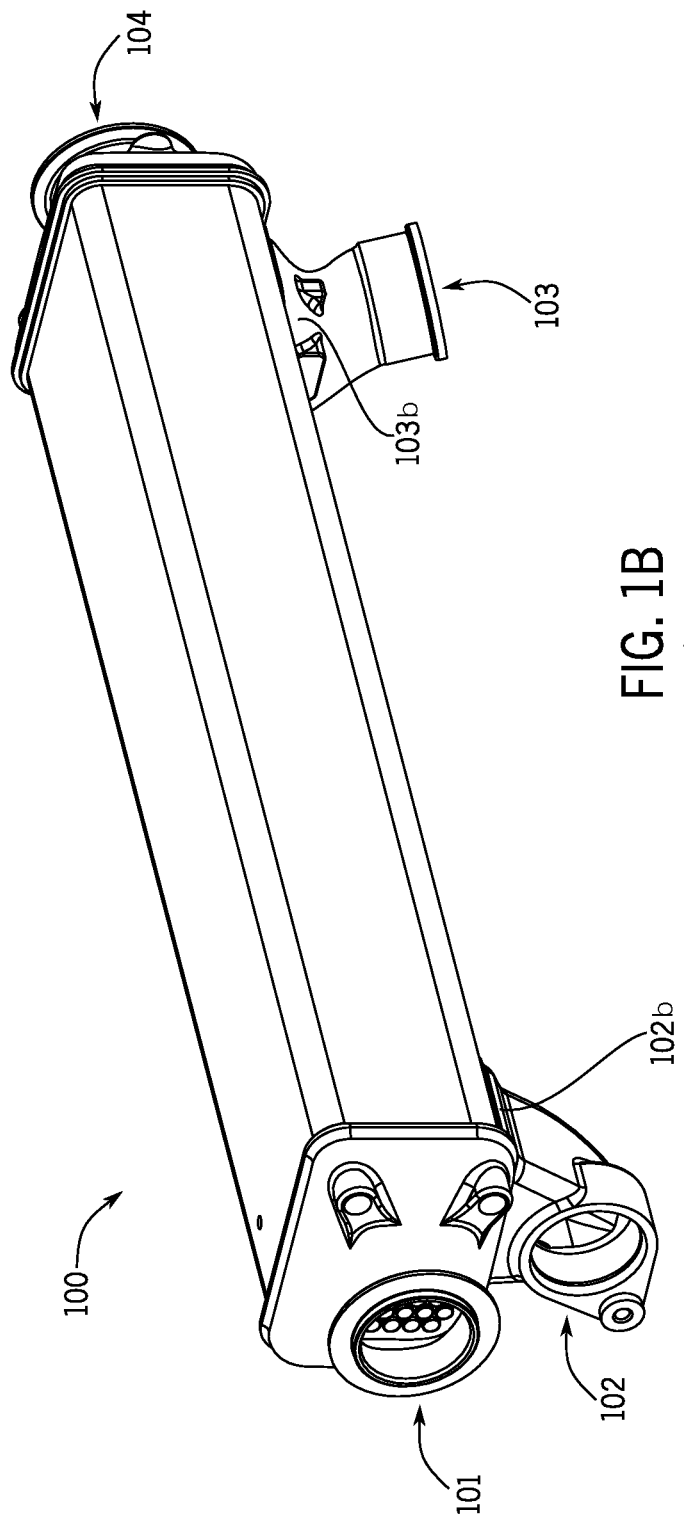
FIG. 1B is a perspective view of the cooler according to the prior art embodiment of FIG. 1A.
Figure 1D:
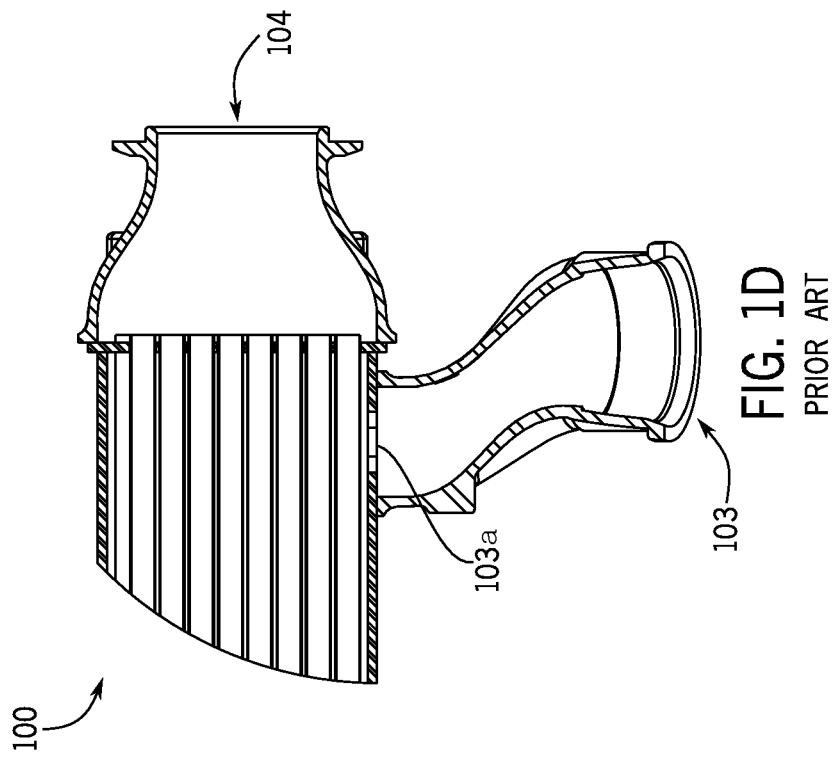
FIG. 1D is an elevated cross-sectional side view of the inlet end of the cooler according to the prior art embodiment of FIG. 1A.
Figure 1C:
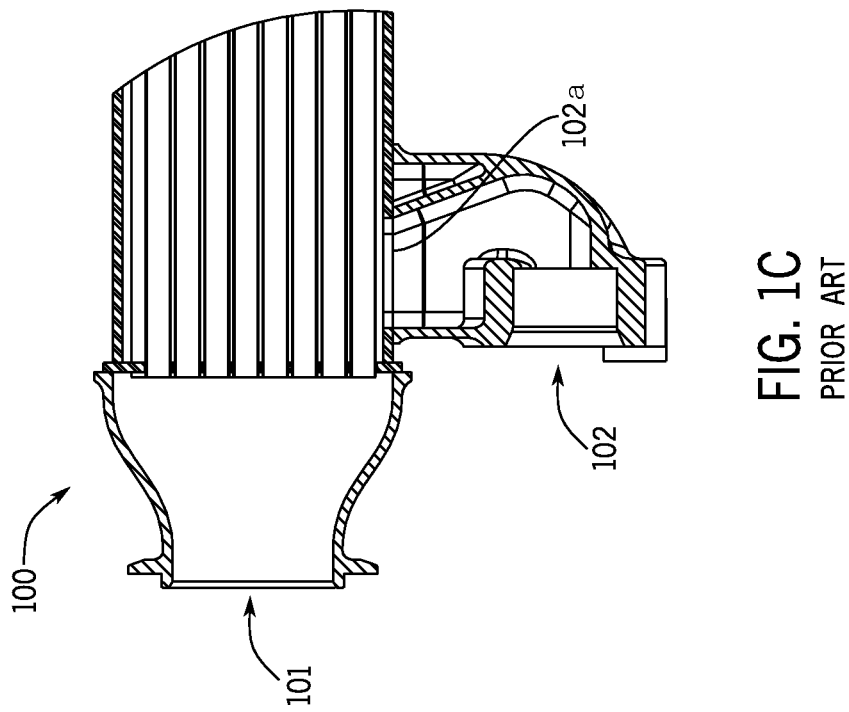
FIG. 1C is an elevated cross-sectional side view of the outlet end of the cooler according to the prior art embodiment of FIG. 1A.

As shown in FIG. 1B, coolant inlet 102 includes inlet element 102*b*. Inlet element 102*b* abuts the lower end of the body of cooler 100, and does not extend around the circumference of the body of cooler 100. As a result, liquid coolant flowing through coolant inlet 102 and into the body of cooler 100 is only introduced at the bottom of the body of cooler 100. Gas tubes situated near the top of the body of cooler 100, therefore, do not directly receive the chilled liquid coolant; at best, those gas tubes receive liquid coolant that has already flowed past a number of hot gas tubes (i.e., the gas tubes disposed between the coolant inlet 102*a* and the top of the body of cooler 100). Thus, the gas tubes near the top receive liquid coolant that has already been warmed by other gas tubes.

Additionally, coolant outlet 103 includes outlet element 103*b*. Like inlet element 102*b*, outlet element 103*b* is disposed at the bottom of the body of cooler 100. Outlet element 103*b* does not extend around the circumference of the body of cooler 100. Thus, liquid coolant exits from the inner cavity of cooler 100 at a single outlet, outlet aperture 103*a*. Because liquid coolant enters and exits the inner cavity of cooler 100 through single apertures, liquid coolant is distributed within the inner cavity of cooler 100 nonuniformly, potentially leading to less-than-optimal cooling.

Coolers of the present application include a combination of tubes and stamped components, which may be joined together via welding or brazing, instead of cast components. An example cooler includes a tubular shell that is open at both ends. Stamped bulkheads are fitted around the ends of the shell, serving as end caps to separate fluid within the shell from fluid outside of the shell. The stamped bulkheads each have a retaining wall that is perpendicular to the tubular shell and includes thereon a set of orifices. Elongated gas tubes can be placed inside the tubular shell and fitted to corresponding orifices on the stamped bulkheads, forming isolated gas channels through the length of the tubular shell. For the purposes of explanation, one stamped bulkhead may serve as an "inlet," while the opposite stamped bulkhead serves as the "outlet"; however, it should be understood that the direction of fluid flow may vary, and that a stamped bulkhead may serve as both an inlet and outlet interchangeably (e.g., gas inlet and liquid coolant outlet, or vice versa).

The stamped bulkheads—or additional components secured to the stamped bulkheads—include both a gas opening and a liquid coolant opening, which may serve as inlets or outlets depending on the direction of the gas and liquid flow. In some implementations, the gas openings are coaxial with the elongated tubes and tubular shell, allowing gas to flow from the opening, through elongated tube openings at the stamped bulkhead, out of the opposite end of the elongated tubes.

The stamped bulkhead may bulge radially outward around the tubular shell, forming an annular chamber that surrounds a portion of the tubular shell. That portion of the tubular shell may include a set of cutouts that allow liquid coolant to flow between the annular chamber and the inner cavity of the tubular shell. The liquid coolant openings of the stamped bulkhead may be placed perpendicularly to the gas openings, permitting liquid coolant to flow through the opening, into the annular chamber, and then into the inner cavity of the tubular shell.

In operation, heated gas is directed to the gas inlet of the inlet stamped bulkhead and liquid coolant to the liquid coolant inlet of the inlet stamped bulkhead. The liquid coolant fills the inner cavity of the tubular shell and surrounds the outer surfaces of the elongated gas tubes. The heated gas flowing through the elongated gas tubes is cooled as heat is transferred to gas tubes, which is drawn off by the liquid coolant. As a result, the heated gas is cooled by the time it exits the outlet end of the cooler. The liquid coolant may continuously flow through the inner cavity, which may itself be cooled by a separate process (e.g., a radiator) before being recirculated back into the tubular shell.

Unlike other EGR systems, coolers of the present application need not comprise specific metal casted components, such as cast housings or cast blocks. Instead, coolers described herein may use "stamped" components and tubes. "Stamping" refers to a metalworking process by which a piece of sheet metal is pressed into a die, causing the sheet metal to conform to the shape of the die. A "stamping" process may include any combination of stamp pressing, punching, bending, embossing, blanking, flanging, or coining. The stamping process may be considered a "cold" process, which is different from forging or casting processes in which metal must be heated before being worked into a desired shape.

Figure 7:
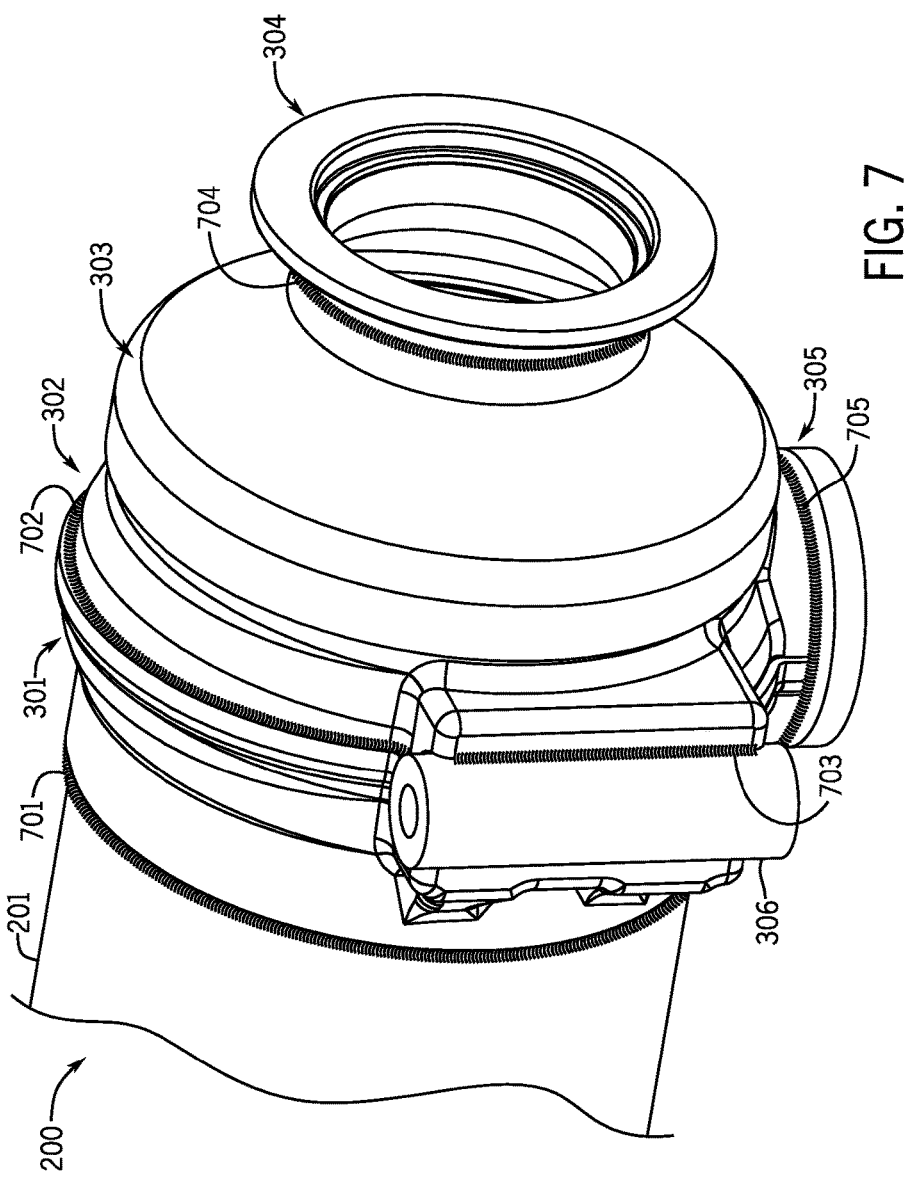
FIG. 7 is a perspective view of the front end of the example cooler illustrating the locations of some of the welds used to adjoin the components at the inlet end of the example cooler, according to the embodiment of FIG. 2.

While the invention can include cast assemblies, the stamping process has numerous advantages over metal casting. First, stamped components can be formed much more quickly than casted components. A die into which metal sheets are pressed can be reused many times. In an assembly line, a stamping press may repeatedly press into the die, such that sheet metal can be fed continuously into the press. Additionally, stamped components do not need to be cooled during formation. As a result, the stamping process can allow for rapid production of components compared to metal casting.

Where stamped components are utilized for the coolers described herein, the stamped parts may be welded or brazed to each other and/or to the tubular shell, forming seals that separate the gas domain of the cooler from the liquid domain of the cooler. An example arrangement includes a stamped bulkhead that fits around a portion of the tubular shell, such that side walls of the stamped bulkhead surround that portion of the tubular shell. In this arrangement, a lap weld at the interface between the stamped bulkhead and outer surface of the tubular shell may secure the stamped bulkhead in place, and form a seal between the environment and the annular chamber between the inner walls of the stamped bulkhead and the outer wall of the tubular shell. Some example welds are shown in FIG. 7 and described in more detail below.

The coolers described herein are particularly, although not exclusively, aimed at providing pre-cooling prior to a valve component in an internal combustion exhaust gas recirculation circuit. In this application, the cooler is fitted in an exhaust gas recirculation (EGR) circuit between an exhaust manifold and an exhaust gas recirculation valve or an EGR cooler, from which the recirculated gas is fed back into an inlet manifold of the internal combustion engine. However, in other applications, the cooler embodiments described herein may be suitable for long route circuit exhaust gas recirculation systems, in which an exhaust gas is sampled downstream of a catalytic converter and is reintroduced into an air inlet of an internal combustion engine upstream of the compressor.

As described herein, a "bulkhead" generally refers to one or more components that serve as a partition between the gas domain and liquid domain of a cooler. In the example described above, the bulkhead includes a retaining wall with orifices into which the elongated gas tubes are fitted. The retaining wall acts as a partition between the gas inlet and the inner cavity of the tubular shell containing liquid coolant. The separation between gas and liquid may be accomplished through a friction or interference fit, together with welding, brazing, or some combination thereof.

As described herein, an "inlet" refers to an opening, chamber, channel, orifice, or some combination thereof into which fluid flows during operation. In a cooler, a gas inlet receives heated gas, while a liquid coolant inlet receives cooled liquid. An inlet may be interfaced with other components of an engine system, such as an exhaust manifold or radiator.

Likewise, an "outlet" refers to an opening, chamber, channel, orifice, or some combination thereof out of which fluid flows during operation. In a cooler, a gas outlet outputs cooled gas, while a liquid coolant outlet outputs warmed liquid. An outlet may be interfaced with other components of an engine system, such as an inlet manifold or radiator.

As described herein, a "stamping" generally refers to a component formed from a stamping process. A variety of components described herein may be considered stampings, including transition stampings, bulkhead stampings, diffusers, eyelets, grommets, rings, and any other component.

As described herein, a "cap" refers to one or more stamped components that fit around an end of a tubular shell. An example cap includes a transition stamping and bulkhead stamping that collectively form the annular liquid coolant chamber, and include orifices forming the elongated gas tube interface. In other instances, a "cap" may be a single stamped component which serves as a bulkhead.

As described herein, a "boss" generally refers to any substantially cylindrical component that can serve as an attachment point. A mounting boss may allow coolers described herein to be mounted within an engine system at a desired position or orientation. Mounting bosses may include threading or other features that engage with corresponding mounting hardware to hold the cooler securely in place.

As described herein, "chilled" or "cooled" fluid—such as gas or liquid—refers to the temperature of the fluid being lower at the inlet of a cooler compared to the temperature of the fluid at the outlet of the cooler. A "chilled" or "cooled" fluid may or may not experience cooling or chilling prior to being fed into an inlet of a cooler. In other words, "chilled" or "cooled" is not intended to refer to a fluid undergoing chilling or cooling prior to being fed into an inlet. For example, a liquid coolant may simply be at, near, or even above an environmental temperature, and may or may not have been cooled by a cooling device (e.g., a radiator).

More generally, "heated," "hot," "chilled," "cooled," or any other term describing the temperature of a fluid or object refers to the relative temperature of that fluid between an inlet end of a cooler and an outlet end of that cooler. Heated gas is therefore cooled by a cooler, while chilled liquid is warmed by the cooler. The actual temperatures of gas and liquid may vary, depending upon the specific implementation and the physical state of the cooler.

In the description below accompanying FIGS. 2-7, the use and operation of an example cooler is described within the context of a gas cooling system in which heated gas flows through the example cooler. Structural elements of the example cooler facilitate the transfer of heat from the heated gas into a liquid coolant, which may be regularly circulated through the example cooler and itself cooled through a separate process. As such, the example cooler below is described as receiving heated gas and chilled coolant at its inlet end, with the example cooler facilitating the exchange of heat from the gas into the coolant. However, one of ordinary skill in the art will appreciate that other applications are also possible; for example, heated coolant could flow through the example cooler and exchange heat with a chilled gas. Other arrangements are also possible.

Figure 2:
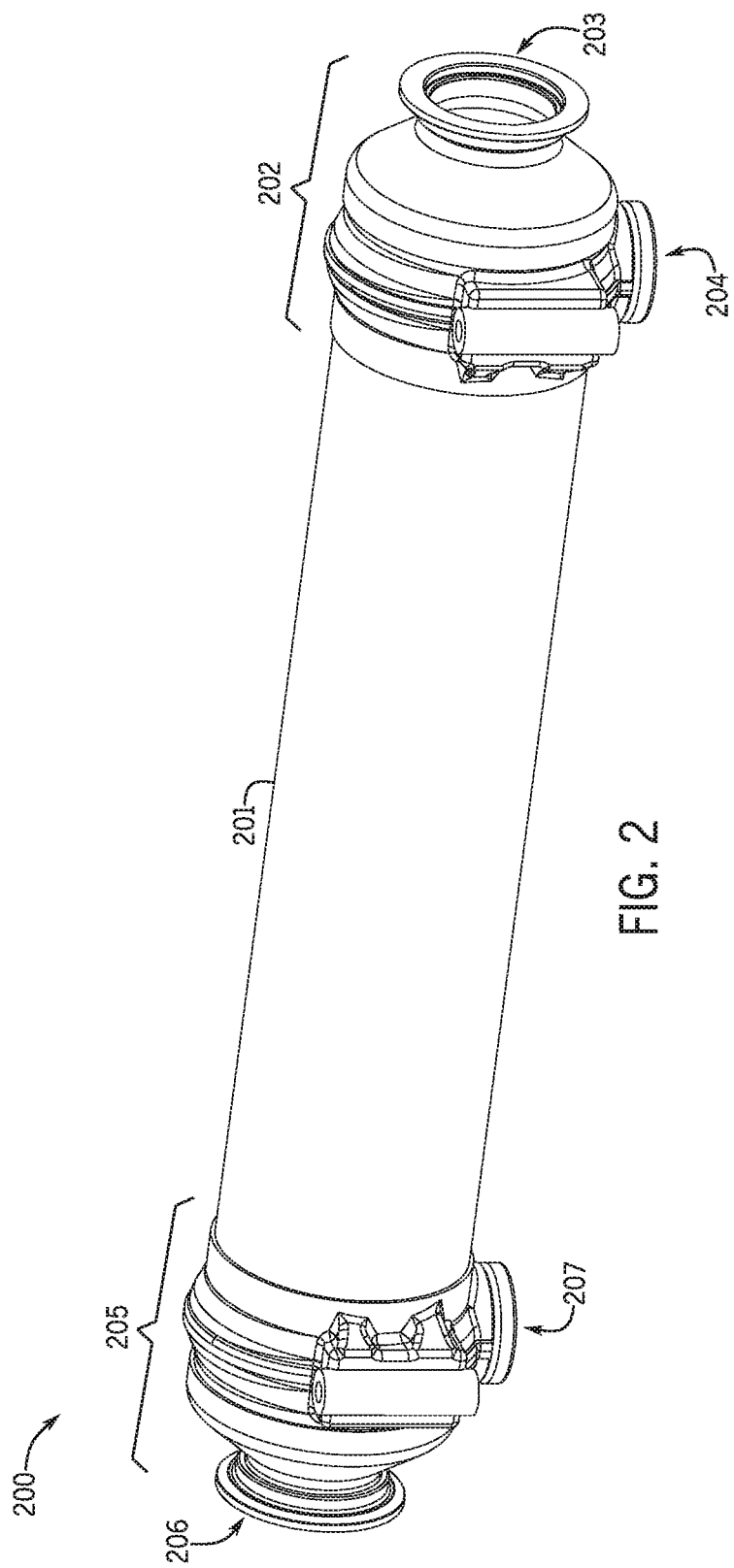
FIG. 2 is a perspective view of an example heat exchanger/cooler of the present invention.

FIG. 2 is a perspective view 200 of an example cooler. The example cooler includes tubular shell 201 having an inlet end 202 and an outlet end 205. Inlet end 202 includes both gas inlet 203 and liquid coolant inlet 204. Likewise, outlet end 205 includes both gas outlet 206 and liquid coolant outlet 207.

Figure 4:
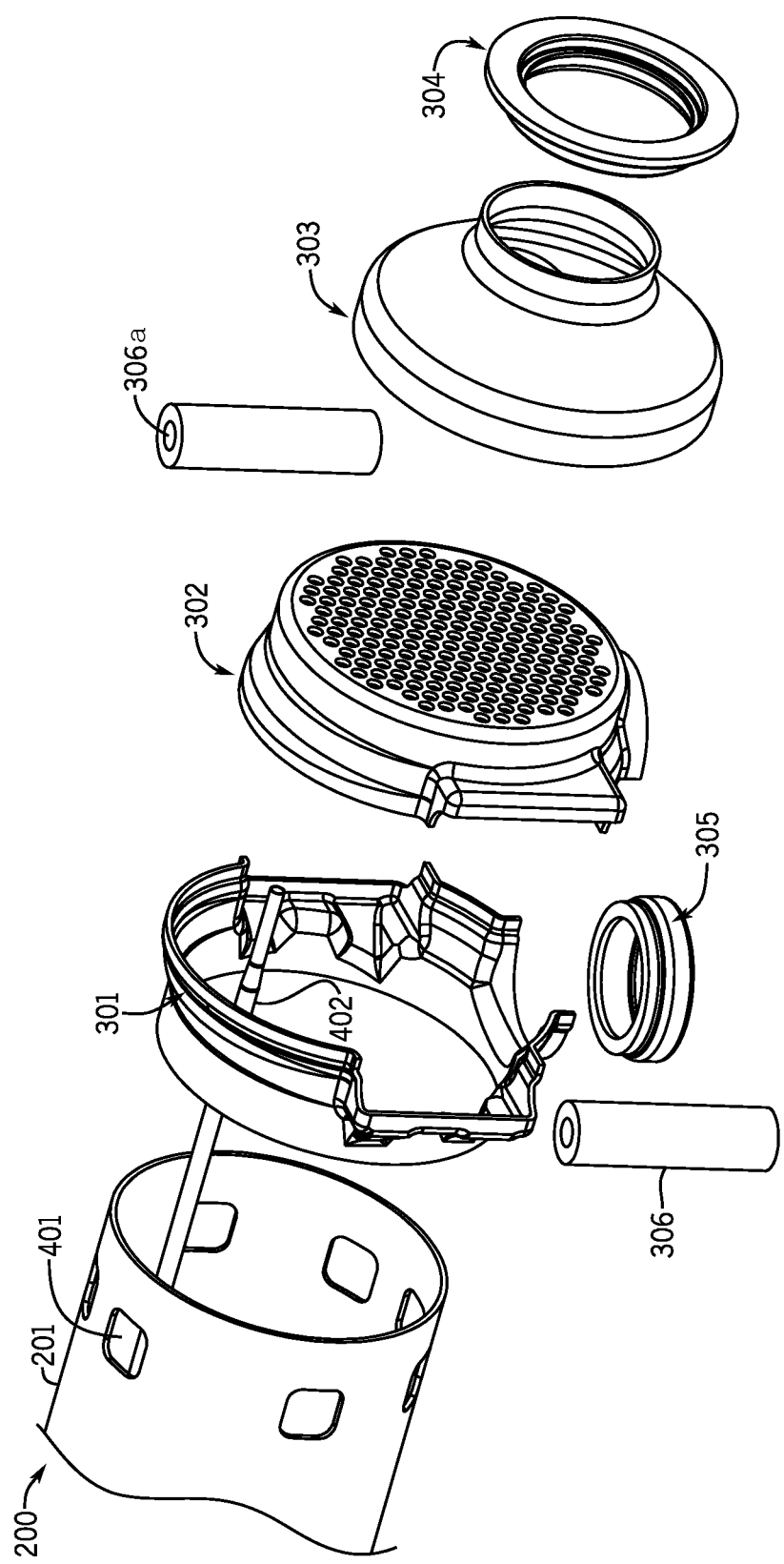
FIG. 4 is an exploded view of the example cooler according to the embodiment of FIG. 2.
Figure 5:
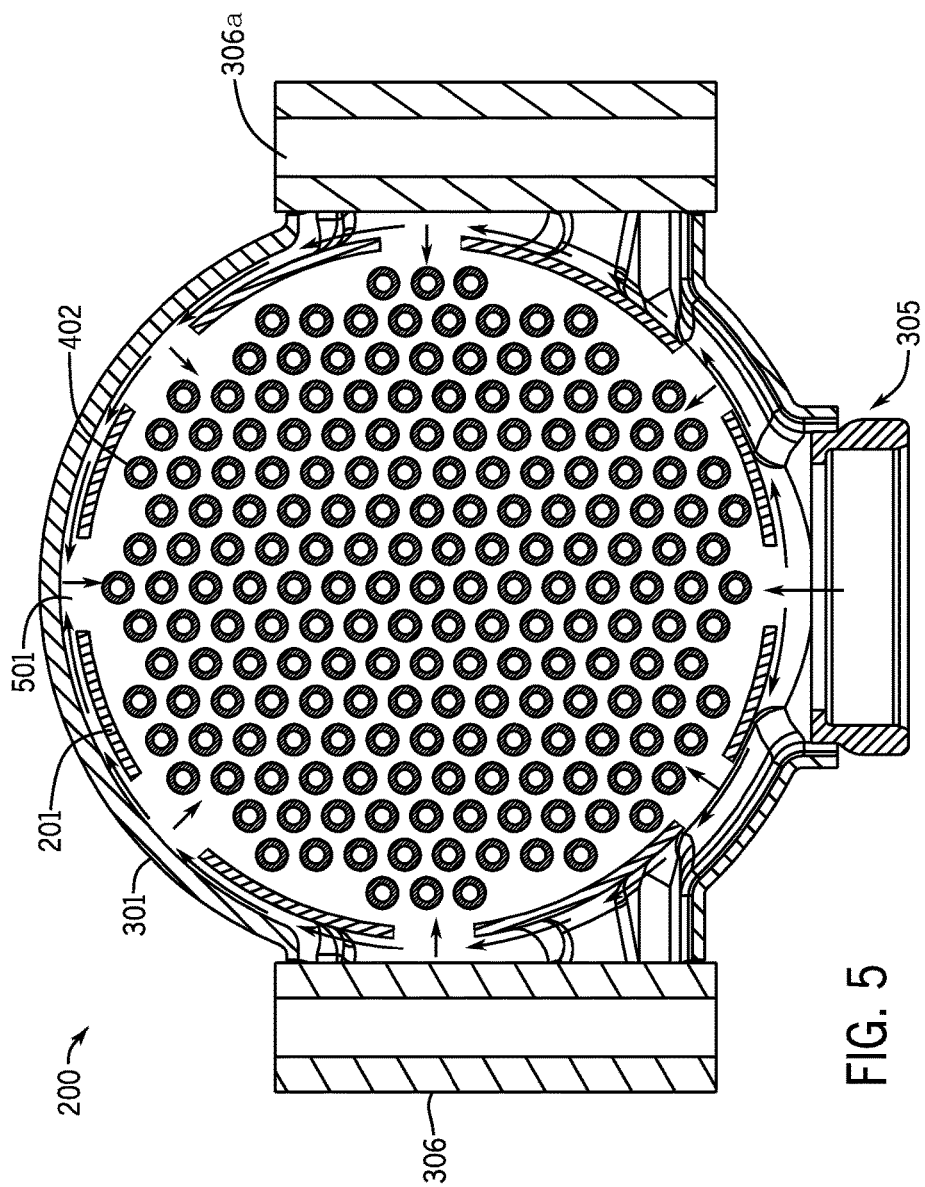
FIG. 5 is an elevated cross-sectional side view of the inlet end of the example cooler according to the embodiment of FIG. 2, taken along lines 5-5 of FIG. 3, illustrating coolant distribution flow through an annular cavity surrounding the tubular housing.
Figure 6:
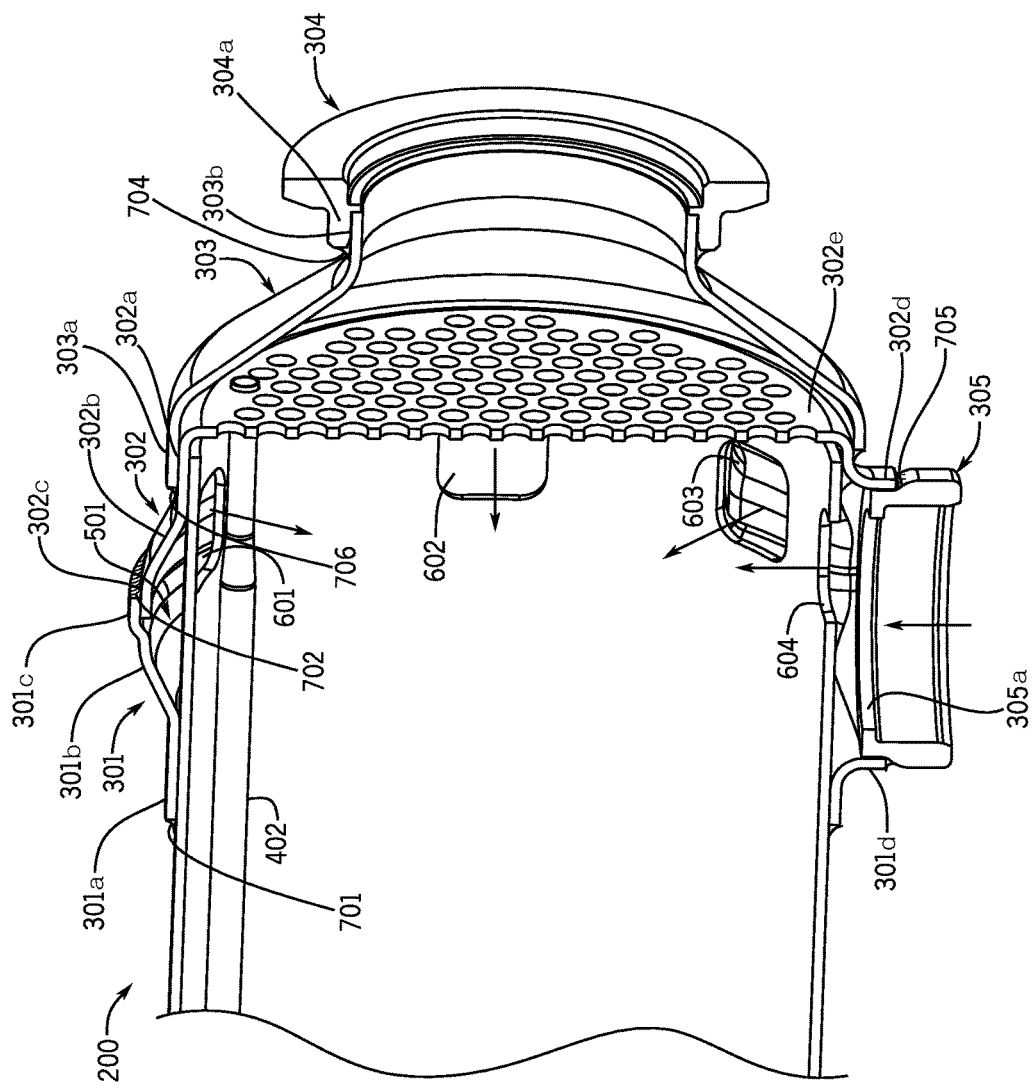
FIG. 6 is a cutaway side view of the inlet end of the example cooler according to the embodiment of FIG. 2, illustrating coolant flow from the annular chamber through and into a cavity within the tubular shell.

In an example operation, heated gas flows through gas inlet 203 and into one or more elongated tubes within the tubular shell 201, which are illustrated and described in more detail in relation to FIGS. 4-6. The heated gas transfers heat into the walls of the elongated tubes. Liquid coolant flows in through the liquid coolant inlet 204 and into a cavity within the tubular shell 201. As liquid coolant fills the cavity within tubular shell 201, it surrounds the elongated tubes therein and is warmed by the transfer of heat from those elongated tubes into the liquid coolant. As heated gas flows through the example cooler, that heated gas is cooled as it traverses through the elongated tubes. Conversely, as liquid coolant flows through the example cooler, that liquid coolant is warmed as is flows from liquid coolant inlet end 204 to liquid outlet end 207.

Inlet end 202 may comprise one or more stamped components, or may include casted components. As shown and described in relation to FIGS. 3-6, inlet end 202 may include multiple stamped components that partially overlap each other to form a "cap" at the inlet end of the cooler, in that the stamped components collectively act to partition the cavity within tubular shell 201 from passageways of gas inlet 203. Similarly, outlet end 205 may include a combination of stamped components that partially overlap each other to form a "cap" at the outlet end of the cooler.

The partial overlap of stamped components may provide for convenient and robust weld seams, which enable the example cooler to withstand high temperatures and pressures. For example, lap welds may fuse overlapping portions of stamped components. Some example welds are illustrated and described in more detail in relation to FIG. 7.

In the example cooler depicted in FIG. 2, gas inlet 203 and gas outlet 206 are axially aligned along a central axis of tubular shell 201. In contrast, liquid coolant inlet 204 and liquid coolant outlet 207 have central axes that are perpendicular to the central axis of tubular shell 201. This geometric arrangement is illustrative and is provided solely for explanatory purposes. Although the arrangement may provide desirable benefits—such as minimizing turbulence in gas flowing from gas inlet 203 through to gas outlet 206—one of ordinary skill in the art would appreciate the benefits of alternative geometric arrangements.

Figure 3:
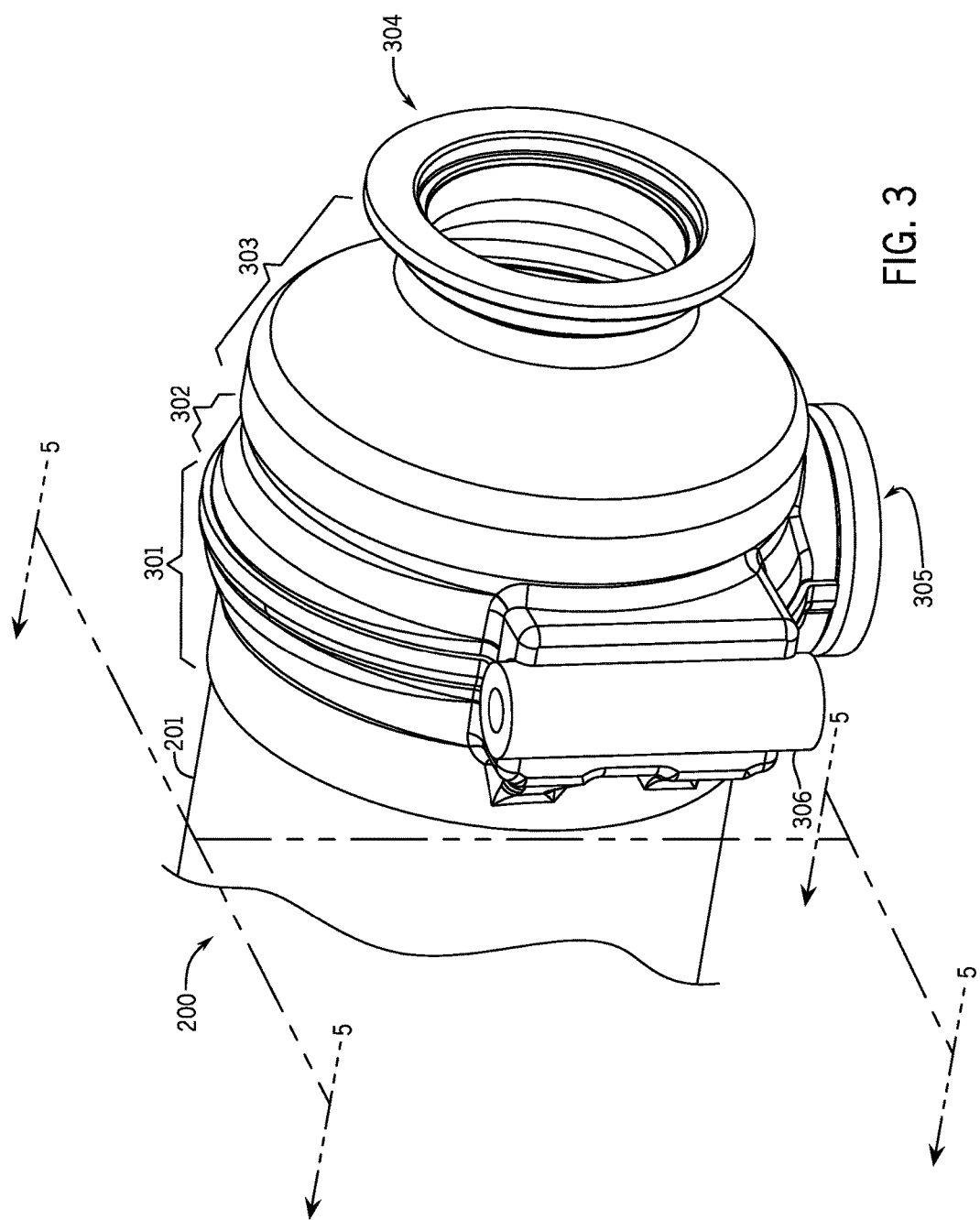
FIG. 3 is a perspective view of an inlet end of the example cooler according to the embodiment of FIG. 2, depicting the transition stamping, bulkhead stamping, diffuser, circular ring, coolant ring, and mounting boss.

FIG. 3 is a perspective view of inlet end 202 of example cooler 200. Inlet end 202 comprises a set of stamped components including transition stamping 301, bulkhead stamping 302, diffuser 303, circular ring 304, coolant ring 305, and mounting boss 306.

In this example, the narrow end of transition stamping 301 overlaps and surrounds a portion of tubular shell 201. The wide region of bulkhead stamping 302 overlaps and surrounds a portion of the wide region of transition stamping 301. Circular ring or transition stamping 301 and bulkhead stamping 302 may be friction fit, fused, welded, brazed, or otherwise joined together to form a fluid-tight seal. As shown in FIG. 3, the wide region of transition stamping 301 and the wide region of bulkhead stamping 302 collectively form a bulge that protrudes radially outward. The space between the inner walls of this radial protrusion and the outer walls of tubular shell 201 form an annular chamber.

Stamping 301 and bulkhead stamping 302 both include a semi-circular coolant inlet opening that meet to form a circular opening. This circular opening is reinforced by coolant ring 305. During operation, liquid coolant flows through the opening provided by coolant ring 305 and into the annular chamber. The annular chamber surrounds one or more cutouts 401 on tubular shell 201, which cutouts provide passageways for liquid coolant to flow into the cavity within tubular shell 201. The cutouts are illustrated and described in more detail with respect to FIG. 4 and FIG. 6. Collectively, the opening defined by coolant ring 305, the annular chamber, and the cavity within tubular shell 201 may form a part of the "coolant domain" or "liquid domain" as described herein.

In some embodiments, the one or more cutouts (also referred to herein as "coolant intake apertures") may be spaced apart, shaped, or sized in a way that optimally or evenly distributes liquid coolant into the central cavity of the housing. For instance, cutouts nearest to coolant inlet may experience greater liquid coolant flow compared to cutouts located further away from the coolant inlet. Some implementations may have fewer and/or smaller cutouts near the coolant inlet, and larger and/or more cutouts further from the coolant inlet in a way that produces an approximately even coolant flow into the central cavity from all directions. One of ordinary skill would appreciate that the arrangement and geometry of cutouts may be formed to provide an even coolant distribution into the central cavity for a particular recirculation cooler design.

Bulkhead stamping 302 also includes a retaining wall with a plurality of orifices that engage with elongated tubes—which are illustrated and described in more detail in relation to FIGS. 4-6—to form seals that prevent fluid from the cavity within tubular shell 201 from flowing past the outer walls of bulkhead stamping 302. The wide region of diffuser 303 may surround and overlap a portion of the narrow region of bulkhead stamping 302. Additionally, circular ring 304 may abut or engage with the narrow region opening of diffuser 303.

During operation, gas flows through the opening provided by circular ring 304 into a gas inlet chamber defined by the inner walls of diffuser 303 and the outer surface of the retaining wall of bulkhead stamping 302. Then, gas within the gas inlet chamber flows into elongated tubes 402 within tubular shell 201. Collectively, the opening defined by circular ring 304, the gas inlet chamber, and the space within the elongated tubes may form a part of the "gas domain" as described herein.

Diffuser 303 may be any type of graduated or tapered annular component that is fitted around the retaining wall of bulkhead stamping 302 and defines a gas inlet chamber. Other diffusers may have different amounts of tapering, or may not be tapered at all. The tapering may be substantially linear, or may be curved. The specific shape and dimensions of diffuser 303 may vary among implementations.

Circular ring 304 may be any type of flange, grommet, sleeve, Marman, or other circular element that engages or interfaces with other tubes or annular elements. One of ordinary skill in the art will appreciate that a variety of circular elements may be used, depending upon the implementation.

In some implementations, transition stamping 301 and bulkhead stamping 302 include features thereon that engage with mounting boss 306. Mounting boss 306 may be a substantially cylindrical piece of metal or other material that includes a central bore, hole, threading, or other feature for mounting and securing the example cooler within a system. Mounting boss 306 may engage with features of transition stamping 301 and bulkhead stamping 302 and be fused or welded thereto. In the example cooler, an additional mounting boss is provided on the opposite end of the transition stamping 301 and bulkhead stamping 302, as depicted most clearly in FIG. 5.

Other implementations may not include mounting bosses or other mounting hardware. In these implementations, transition stamping 301 and bulkhead stamping 302 may not include features configured to engage with mounting bosses. The circular ring 304 and/or other elements of the example cooler may rigidly secure the example cooler within a system without the need for mounting bosses.

FIG. 3 also illustrates a plane that intersects with mounting boss 306, coolant ring 305, and tubular shell 201, among other components. This plane serves as the cross-sectional plane for FIG. 5, which is described in greater detail below.

FIG. 4 is an exploded view of components of the example cooler 200. As shown in FIG. 4, tubular shell 201 includes a plurality of coolant aperture cutouts, such as cutout 401. These cutouts are circumferentially spaced around the inlet end of tubular shell 201 and, in an assembled cooler, are surrounded by the annular chamber formed by circular ring 301 and bulkhead 302. During operation, liquid coolant flows through coolant inlet ring 305, into the annular chamber, and through the cutouts into the cavity of tubular shell 201.

Tubular shell 201 includes therein elongated gas tube 402. Elongated gas tube 402 is arranged such that its central axis is parallel to the central axis of tubular shell 201. In an assembled cooler, one end of elongated gas tube 402 engages with a respective orifice on the retaining wall of bulkhead stamping 302. In some instances, one end of elongated gas tube 402 is friction fit with a respective orifice, forming a seal that prevents liquid coolant within the cavity of tubular shell 201 from passing through and into the gas inlet chamber. In other instances, one end of elongated gas tube 402 is welded, brazed, or otherwise fused with a respective orifice to form the fluid-tight seal.

Mounting bosses of the example cooler may include fastening hole 306a—such as a bore or screw hole—that is adapted to engage with a corresponding fastener. Fastening hole 306a may include threading for rotatably engaging with a screw. As another example, fastening hole 306a may be a smooth bore for receiving a bolt or rod. Other fastening techniques are also possible. Regardless of the particular type of fastener used, fastening hole 306a serves to enable the example cooler to be secured or mounted within another system, such as within an engine bay.

Although FIG. 4 illustrates a cooler with a single elongated gas tube 402, the invention contemplates the use of any number of elongated gas tubes that may be included within other implementations, which sealedly engage with the same number of respective orifices on bulkhead stamping 302. The dimensions of elongated gas tubes may vary among implementations, depending upon a desired amount of cooling. The dimensions of the orifices on the retaining wall of bulkhead stamping 302 may correspond to the dimensions (e.g., the radius) of elongated gas tube 402, such that their dimensions permit a fluid-tight seal to form when the gas tubes engage with respective orifices.

Additionally, elongated gas tube 402 is illustrated in FIG. 4 to have a tapered region in which the radius of the tube decreases near the inlet end of tubular shell 201. Various implementations may or may not include such tapering in elongated gas tube 402. Other elongated gas tubes may include tapering that increases the radius near the inlet end of tubular shell 201. Other elongated gas tube shapes are also possible.

FIG. 5 is an elevated side view of the inlet end of example cooler 200, illustrating coolant flow through an annular cavity surrounding tubular shell 201. The flow of liquid coolant is illustrated using arrows in FIG. 5. As described above, liquid coolant flows through an opening defined by coolant ring 305 and into annular chamber 501. As liquid coolant flows circumferentially around annular chamber 501, it reaches one or more cutouts on the tubular shell 201, which provide passageways for liquid coolant to flow into the cavity within tubular shell 201. The number, dimensions, and arrangement of cutouts on tubular shell 201 may be provided in a way that provides for even and consistent coolant flow distribution.

FIG. 5 also illustrates elongated gas tube 402 sealedly engaging with a respective orifice on the retaining wall of bulkhead stamping 302. The respective orifice is illustrated using a thicker weighted line along the circumference of the orifice compared to the other orifices on bulkhead stamping 302. In this manner, each elongated gas tube within a cooler may correspond to a respective orifice on the retaining wall of bulkhead stamping 302.

Additionally, FIG. 5 illustrates a plurality of intake apertures or cutouts that direct liquid coolant within annular chamber 501 into the cavity within tubular shell 201. Because the intake apertures are spaced apart around the circumference of tubular shell 201, liquid coolant is directed into the cavity in a more evenly distributed fashion. Unlike prior art cooler 100, example cooler 200, as shown in FIG. 5, distributes liquid coolant at multiple circumferential input locations. In this manner, gas flowing through the gas tubes within tubular shell 201 experiences a substantially even amount of cooling.

FIG. 6 is a cutaway side view of the inlet end of example cooler 200, illustrating coolant flow from the annular chamber 501 into a cavity within the tubular shell. As liquid coolant flows in through the opening defined by coolant ring 305 and around the annular chamber 501, it potentially interfaces with cutout 601, cutout 602, cutout 603, and/or cutout 604. Each of cutouts 601-604 serve as passageways between annular chamber 501 and the cavity within tubular shell 201.

As shown in FIG. 6, the cavity within tubular shell 201 contains elongated gas tube 402. Liquid coolant flowing through coolant aperture cutouts 601-604, enter that cavity, and pass over the outer surface of elongated gas tube 402. That liquid coolant then flows toward the outlet end of the tubular shell, and flows out of similar cutouts, into a similar outlet annular chamber, where it can exit the cooler through an outlet coolant ring. In this manner, heat exchanged from heated gas flowing through elongated gas tube 402 is transferred into the liquid coolant that exits the tubular shell 201.

FIG. 6 also illustrates the partial overlapping of stamped components of the example cooler. The wide region 301c of transition stamping 301 overlaps the wide region 302c of bulkhead stamping 302, which provides a convenient seam around the circumference of the overlap for lap weld 702 or other similar weld. The narrow region 302a of bulkhead stamping 302 is overlapped by the flange portion 303a of diffuser 303. Furthermore, flange portion 304a of circular ring 304 overlaps the narrow region 303b of diffuser 303. Additionally, the semi-circular opening 301d of transition stamping 301 and the semi-circular opening 302d of bulkhead stamping 302 overlap the insert portion 305a of coolant ring 305. These overlaps may beneficially serve to provide convenient seams that allow for robust and inexpensive fusing of components with, for example, lap weld 705.

Beveled portion 301b of annular ring 301, wide portion 301c of annular ring 301, wide portion 302c of tube retention cap 302, and beveled portion 302b of tube retention cap 302 collectively form a radially-protruding region referred to herein as annular chamber 501. Annular chamber 501 at least partially surrounds cutouts 601-604 and distributes liquid coolant around and through cutouts 601-604.

Annular ring 301 and tube retention cap 302 may, in some instances, be formed from a single integrated piece of material. The combination of annular ring 301 and tube retention cap 302 may be referred to herein as the "cap assembly." The cap assembly includes retaining wall 302e, and a flange at least partially defined by the annular ring 301, wide portion 302c of tube retention cap 302, beveled portion 302b of tube retention cap 302, and narrow portion 302a of tube retention cap 302.

FIG. 7 is a perspective view illustrating the locations of possible welds used to adjoin components example cooler 200. As described above, the partial overlaps of annular ring 301, tube retention cap 302, diffuser 303, circular ring 304, and coolant ring 305 serve as seams along which welding or other fusing techniques may be employed.

As shown in FIG. 7, weld 701 joins annular ring 301 to tubular shell 201. Weld 702 joins annular ring 301 to tube retention cap 302 and partially seals the annular chamber within annular ring 301 and tube retention cap 302. Weld 703 joins annular ring 301 and tube retention cap 302 to mounting boss 306, and further seals the annular chamber. Weld 704 joins diffuser 303 to circular ring 304. Weld 705 joins annular ring 301 and tube retention cap 302 to coolant ring 305 and—in conjunction with welds 701, 702, and 703—further seals the annular chamber.

Although the joints at which welds 701-705 are described as being fused together by welding, other joining techniques, such as soldering or brazing, may be employed without departing from the scope of the present application. One of ordinary skill would appreciate the benefits of a given joining method with respect to manufacturing costs, strength of the joints, and/or other design considerations.

The tubular housing may be formed from components of a metallic material, cast, stamped, or otherwise. In some cases, the tubular housing may be formed from a rolled sheet of rectangular metal, which is joined along an abutting or overlapping seam to form a tube. In other cases, the tubular houses is formed by pressing a piece of metal through a die to extrude a substantially cylindrical shape with a hollow central cavity. Other manufacturing processes are also possible.

Any components of heat exchangers described herein may be formed by one or more manufacturing processes, including casting, stamping, extrusion, injection molding, and/or other processes. Additionally, components of heat exchangers described herein may be sealedly engaged or joined together by one or more fusing processes, including welding or brazing. The particular process or combination of processes used in the manufacture of a particular heat exchanger may depend upon material cost, production complexity, the availability of materials, and/or the expected thermal and pressure stresses to be experience by the particular heat exchanger, among other factors.

FIG. 8 illustrates another example cooler 800. In contrast with the embodiments described above—in which the annular coolant chamber was formed from annular ring 301 and tube retention cap 302—annular coolant chamber 816 of cooler 800 is formed between the inner walls of sleeve 811a and the outer walls of tubular housing 801. In other words, sleeve 811a serves substantially the same purpose as the integrated combination of annular ring 301 and tube retention cap 302.

Sleeve 811a is telescopically positioned over a coolant distribution portion of tubular housing 801, and tube retention cap 812a is secured to the end of sleeve 811a. Tube retention cap 812a includes thereon gas tube orifices, and serves as a bulkhead to separate the coolant domain within the inner walls of tubular housing 801 from the gas domain between tube retention cap 812a and diffuser 813. In some implementations, gasket 812b is situated at the joint between sleeve 811a and tube retention cap 812a.

Sleeve 811a also includes cutout 811b (shown in FIG. 9) therethrough, against which coolant inlet 815 is aligned. When coolant inlet 815 is secured against sleeve 811a in substantial alignment with aperture 811b, coolant inlet 815 provides a channel into which liquid coolant flows. That liquid coolant continues into annular coolant chamber 816 (defined by the space between the outer walls of tubular housing 801 and the inner walls of sleeve 811a), where the liquid coolant is distributed through one or more intake apertures, such as intake apertures 802a and 802b. In implementations with multiple intake apertures, those intake apertures may be spaced around the circumference of the tubular housing, such that liquid coolant is distributed into the central cavity of tubular housing 801 at multiple points (e.g., in a way that evenly distributes liquid coolant).

Additionally, cooler 800 includes circular ring 814a. Circular ring 814a may serve as a flange for mating cooler 800 with a source of heated gas, such as an engine's exhaust. In some implementations, gasket 814b is situated between circular ring 814a and diffuser 813, to provide a sealed connection therebetween and prevent heated gas from escaping the diffuser 813.

In the embodiment shown in FIG. 8, intake aperture 802b is shown to extend all the way to the front end of tubular housing 801. Intake aperture's 802b position may be preferable, such that liquid coolant flowing therethrough reaches the portions of the gas tubes immediately adjacent to the inner walls of tube retention cap 812a. In this manner, heated gas flowing into those gas tubes is immediately subjected to cooling. It should be understood that intake apertures may be positioned differently than shown in FIG. 8 without departing from the scope of the invention.

Similar to embodiments shown and described above, cooler 800 may include, in some implementations, components at inlet end 810 and outlet end 820 that are interchangeable. In such instances, a single component (e.g., tube retention cap 812a) can be used at either inlet end 810 or outlet end 820. This may result in a variety of benefits, including reduced manufacturing costs.

In other embodiments, a particular cooler may be modular. A given tubular housing design may be fitted with multiple, different cap assemblies. For example, tubular housing 201 could potentially be fitted with a cap assembly comprised of sleeve 811a and tube retention cap 812a (rather than annular ring 301 and tube retention cap 302). Other combinations are also possible. In other instances, one cap assembly may be used at the inlet end of a tubular body, while a different cap assembly is used at the outlet end of the tubular body. The particular combination of components used in a cooler may depend on design constraints, expected temperatures and/or pressures, and other considerations.

The particular shapes and arrangement of components of cooler 800 may advantageously simplify aspects of the manufacturing process of such coolers. As shown in FIG. 8, sleeve 811a is telescopically received over the front end of tubular housing 801, tube retention cap 812a fits against the open end of sleeve 811a, diffuser 813 fits over tube retention cap 812a and a portion of sleeve 811a, and so on. Applying braze paste or another bonding agent at junctures where two or more components meet can greatly simplify the process of assembling and sealing a cooler. For example, braze paste can be applied at each of the component joints, which are initially press fit together. Then, the assembled cooler can be heated to join the components together. Other component shapes and arrangements are also possible.

Although not shown in FIGS. 8 and 9, cooler 800 also includes one or more elongated gas tubes, extending from inlet end 810 to outlet end 820 and sealedly engaged with respective gas tube orifices on respective tube retention caps.

FIG. 9 depicts an elevated cross-sectional side view of cooler 800. As shown in FIG. 9, annular coolant chamber 816 surrounds a coolant distribution portion of tubular housing 801. As liquid coolant flows into annular coolant chamber 816 and around tubular housing 801, portions of that liquid coolant are directed through intake apertures on tubular housing 801 (including intake apertures 802a and 802b). This liquid coolant flows through the central cavity of tubular housing 801 toward outlet end 820 of cooler 800.

As with the above-described embodiments, forming each of the components of cooler 800 may involve stamping. For instance, diffuser 813 may be formed by pressing a tubular piece of metal into one or more dies. Likewise, the formation of gas tube orifices on tube retention cap 812a may involve stamping tubular housing 801 into a die that "punches out" circular pieces of metal of tube retention cap 812a. Some components—such as tubular housing 801 or elongated gas tubes—may be formed by extrusion. Other manufacturing techniques are also possible.

FIG. 10 illustrates another example cooler 1000. In contrast with the embodiments described above—in which the annular coolant chamber was formed from one or more components fitted around a portion of a tubular housing— annular coolant chamber 1017 of cooler 1000 is formed between the inner walls of coolant distribution portion 1002 of tubular housing 1001 and the outer walls of distribution insert 1011. In this embodiment, coolant distribution portion 1002 is situated at the front end of tubular housing 1001. The coolant distribution portion 1002 has a radius that is larger than the central portion of tubular housing 1001, which permits distribution insert 1011 to be telescopically received therein.

Distribution insert 1011 may have approximately the same radius as that of the central portion of tubular housing 1001, such that inserting distribution insert 1011 (and welding, brazing, or otherwise sealedly securing it in place) creates annular coolant chamber 1017 (shown in FIG. 11) therebetween. As in the embodiments described above, liquid coolant may be directed through coolant inlet 1016 and into annular coolant chamber 1017. As liquid coolant flows through and around annular coolant chamber 1017, portions of that liquid coolant pass through one or more intake apertures (such as intake aperture 1012) and into the central cavity of tubular housing 1001.

Unlike the embodiments described above—where the intake apertures were located on the tubular housing—the intake apertures (including intake aperture 1012) of cooler 1000 are located on distribution insert 1011. In this embodiment, coolant distribution portion 1002 of tubular housing 1001 radially protrudes with respect to the radius of the central portion of tubular housing 1001. Here, the outer walls of distribution manifold 1011 and the inner walls of coolant distribution portion 1002 form annular coolant chamber 1017. Thus, it should be understood that circumferential distribution of liquid coolant in a heat exchanger, which is achieved by an annular coolant chamber, can be constructed in a variety of ways.

Similar to embodiments shown and described above, cooler 1000 may include, in some implementations, components at inlet end 1010 and outlet end 1020 that are interchangeable. In such instances, a single component (e.g., distribution insert 1011) can be used at either inlet end 1010 or outlet end 1020. This may result in a variety of benefits, including reduced manufacturing costs.

Also similar to the embodiments shown and described above, cooler 1000 includes diffuser 1014 and circular ring 1015, which collectively form a gas inlet coupler at inlet end 1010 of cooler 1000. Circular ring 1015 may serve as a flange adapted to couple with another flange (e.g., a heated gas source, such as an exhaust pipe or manifold).

FIG. 11 depicts an elevated cross-sectional side view of cooler 1000. As shown in FIG. 11, annular coolant chamber 1017 surrounds distribution insert 1011, which is situated within coolant distribution portion 1002 of tubular housing 1001. As liquid coolant flows into annular coolant chamber 1017 and around coolant distribution portion 1002, portions of that liquid coolant are directed through intake apertures on distribution insert 1011 (including intake aperture 1012). This liquid coolant flows through the central cavity of tubular housing 1001 toward outlet end 1020 of cooler 1000.

Figure 12:
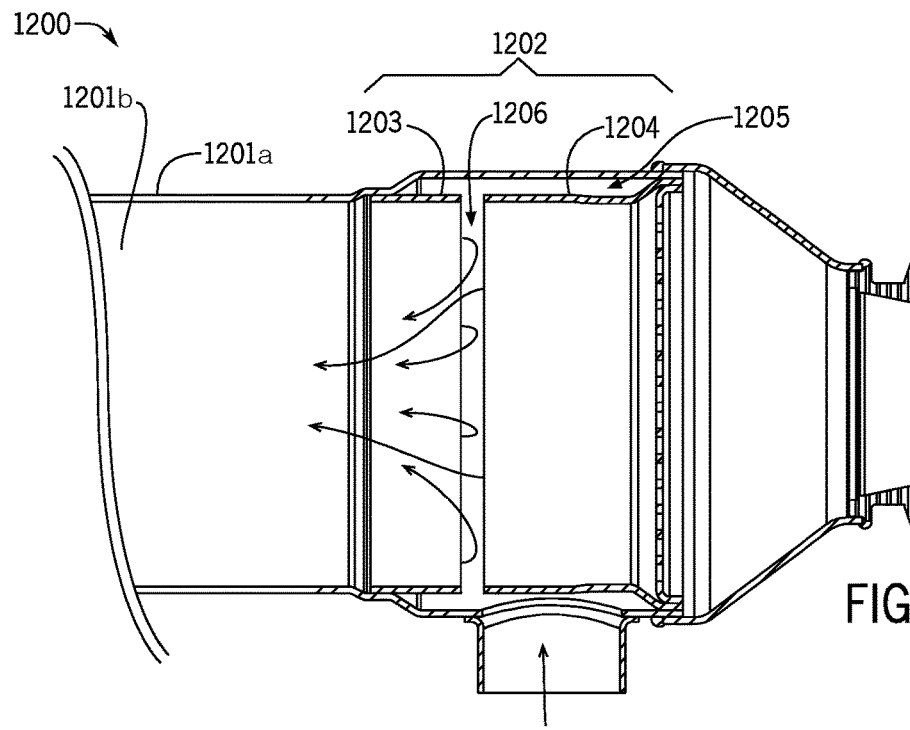
FIG. 12 is an elevated cross-sectional side view of a portion of another example heat exchanger/cooler of the present invention having a continuous slot for directing liquid coolant from the annular coolant chamber into the cavity of the tubular housing.

FIG. 12 depicts an elevated cross-sectional side view of a portion of another example heat exchanger 1200, having continuous slot 1206 for directing liquid coolant from annular coolant chamber 1205 into cavity 1201b of tubular housing 1201a. Heat exchanger 1200 is similar to cooler 1000, in that annular coolant chamber 1205 is formed between the inner walls of coolant distribution portion 1202 of tubular housing 1201a and the outer walls of an insert disposed within the coolant distribution portion 1202.

However, unlike cooler 1000, heat exchanger 1200 includes two distinct inserts—first insert 1203 and second insert 1204, which are maintained in a spaced relationship so as to form continuous annular slot 1206. Continuous slot 1206 may serve to direct liquid coolant circumferentially distributed within annular coolant chamber 1205 into cavity 1201a, similarly to intake apertures 1012 of cooler 1000. In other words, a continuous annular slot may replace one or more discrete coolant apertures as shown and described with respect to other embodiments of the present invention, while still providing the advantages of one or more discrete coolant apertures.

Thus, as described herein, "one or more coolant intake apertures" may refer to a single coolant intake aperture, a plurality of coolant intake apertures, an elongated or circumferential aperture, or a continuous slot (which may be described as a single continuous aperture, or no aperture). Heat exchangers and coolers of the present invention may utilize any combination of voids, formed from any number of elements, to facilitate the circumferential distribution of liquid coolant within an annular coolant chamber and to direct the distributed liquid coolant into a cavity of a tubular housing.

Figure 13:
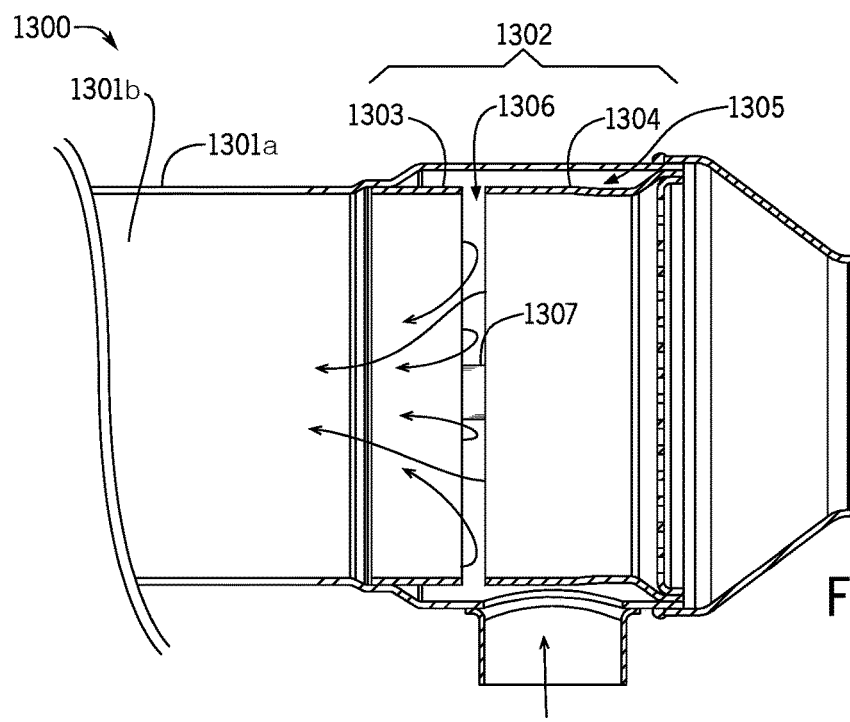
FIG. 13 is an elevated cross-sectional side view of a portion of another example heat exchanger/cooler of the present invention having an elongated circumferential aperture for directing liquid coolant from the annular coolant chamber into the cavity of the tubular housing.

FIG. 13 depicts an elevated cross-sectional side view of a portion of another example heat exchanger 1300, having elongated circumferential aperture 1306 for directing liquid coolant from annular coolant chamber 1305 into cavity 1301b of tubular housing 1302. Heat exchanger 1300 is similar to heat exchanger 1200. However, unlike heat exchanger 1200, heat exchanger 1300 includes bridge 1307 rigidly coupling first insert 1303 with second insert 1304.

Bridge 1307 may be a rigid, substantially rectangular piece of material that maintains first insert 1303 and second insert 1304 in a spaced relationship to form and maintain elongated circumferential aperture 1306.

In some implementations, first insert 1303, second insert 1304, and bridge 1307 are integrally formed. For example, a single tubular section of metal may have a radial arc cut out from its center, forming elongated circumferential aperture 1306. In other examples, first insert 1303 is initially a separate piece from second insert 1304, with bridge 1307 being affixed (e.g., brazed or welded) to both first insert 1303 and second insert 1304.

Regardless of the particular manner in which first insert 1303, second insert 1304, and bridge 1307 are formed, it should be understood that "one or more apertures" may refer to an elongated circumferential aperture, such as elongated circumferential aperture 1306. Such an elongated circumferential aperture may extend around a substantial portion of an insert or inserts (e.g., more than 180 degrees), forming a radial "mouth" through which liquid coolant can operably flow into the central cavity of a heat exchanger's tubular housing.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

The invention claimed is:

1. A heat exchanger for cooling heated gas using liquid coolant, said heat exchanger comprising:
   a tubular housing having a front end, a rear end and an outer wall, said tubular housing including one or more coolant intake apertures circumferentially spaced within a coolant distribution portion of the tubular housing that is substantially proximate the front end, said tubular housing having one or more walls that at least partially define a cooling cavity;
   a tube retention cap sealedly engaged proximate to the front end of the tubular housing, said tube retention cap including at least one gas tube orifice;
   a sleeve having an inner wall sealedly positioned about said coolant distribution portion of the tubular housing;
   an annular coolant chamber formed by the inner wall of said sleeve and the outer wall of said tubular housing, said annular coolant chamber surrounding said coolant distribution portion of the tubular housing, said annular coolant chamber adapted to distribute liquid coolant around the one or more coolant intake apertures and to, in turn, direct liquid coolant around and through the one or more coolant intake apertures into the cooling cavity of the tubular housing, said coolant chamber wholly positioned about a portion of said cooling cavity;

a coolant inlet integrated with the annular coolant chamber, said coolant inlet adapted to receive liquid coolant and to, in turn, direct liquid coolant into and through the annular coolant chamber;

at least one elongated gas tube sealedly engaged with and extending from the at least one gas tube orifice into the cooling cavity of the tubular housing toward said rear end, said at least one elongated gas tube capable of being immersed in liquid coolant positioned within said cooling cavity to facilitate an exchange of heat from heated gas into liquid coolant;

a gas inlet coupler at the front end of said tubular housing, said gas inlet coupler positioned proximate the front end of said tubular housing over said tube retention cap, said gas inlet coupler adapted to receive heated gas and to direct heated gas through said at least one gas tube orifice and into the at least one elongated gas tube;

a coolant outlet disposed substantially proximate the rear end of the tubular housing, said coolant outlet adapted to receive liquid coolant from within the cooling cavity and to release liquid coolant from the cooling cavity of the tubular housing; and a gas outlet coupler at said rear end of the tubular housing, said gas outlet coupler adapted to direct cooled gas from the at least one elongated gas tube.

2. The heat exchanger according to claim 1, in which said sleeve is a cap assembly, said cap assembly comprising a flange surrounding the tube retention cap, and an annular ring affixed to an outer surface of the tubular housing.

3. The heat exchanger according to claim 2, in which the flange surrounding the tube retention cap includes said annular ring as an integrated element, for affixation of said integrated element about said outer surface of the tubular housing, at a location substantially aligned with the orientation of said one or more coolant intake apertures.

4. The heat exchanger according to claim 3, further comprising:
an alignment bead affixed to the outer surface of the tubular housing, wherein said integrated element abuts against and is sealedly engaged with the alignment bead.

5. The heat exchanger according to claim 2, in which said cap assembly further comprises a retaining wall having a first side and a second side, and has positioned therethrough the at least one gas tube orifice, said at least one gas tube orifice being capable of allowing gas to pass through the retaining wall from the first side toward the second side and into said at least one elongated gas tube.

6. The heat exchanger according to claim 5, in which the retaining wall comprises:
a substantially cylindrical bulkhead, said bulkhead abutting the outer surface of the tubular housing adjacent its front end.

7. The heat exchanger according to claim 2, in which said flange surrounding the tube retention cap and the annular ring affixed to the tubular housing collectively define at a position about said tubular housing an opening into which said coolant inlet is positioned.

8. The heat exchanger according to claim 7, in which the coolant inlet further comprises:
a coolant inlet ring secured to the opening collectively defined by the tube retention cap and said annular ring affixed to the tubular housing.

9. The heat exchanger according to claim 8, in which the coolant inlet ring is affixed to the tube retention cap by one of a braze and weld.

10. The heat exchanger according to claim 2, in which the cap assembly is sealedly attached to the outer surface of the tubular housing at positions defined by both said flange surrounding the tube retention cap and said annular ring, by one of a braze and weld.

11. The heat exchanger according to claim 2, in which the cap assembly further includes one or more mounting bosses secured thereto.

12. The heat exchanger according to claim 11, in which the one or more mounting bosses are restrainably attached to the cap assembly by one of a braze and weld.

13. The heat exchanger according to claim 2, in which the gas inlet coupler comprises:
a substantially frusto-conical diffuser that is configured for juxtaposition and is sealedly attached about the flange surrounding the tube retention cap, said gas inlet coupler defining a gas inlet chamber for receiving heated gas and for directing heated gas into the at least one elongated gas tube.

14. The heat exchanger according to claim 13, in which the heat exchanger further comprises:
a circular ring that at least partially surrounds the diffuser, said circular ring adapted to be sealedly attached to a source of heated gas and serves to direct heated gas into the gas inlet chamber.

15. The heat exchanger according to claim 14, in which the circular ring is affixed to the diffuser by one of a braze and weld.

16. The heat exchanger according to claim 5, in which the tube retention cap is an inlet tube retention cap, wherein said annular coolant chamber is an annular coolant inlet chamber, wherein the cap assembly is an inlet cap assembly, wherein the at least one gas tube orifice is at least one gas tube inlet orifice, and wherein the tubular housing also includes an outlet cap assembly adjacent to its rear end.

17. The heat exchanger according to claim 16, in which the heat exchanger further comprises an annular coolant outlet chamber, said annular coolant outlet chamber comprising said outlet cap assembly, said outlet cap assembly comprising an outlet tube retention cap having a flange positioned thereabout and an outlet annular ring affixed to the outer surface of the tubular housing proximate its rear end.

18. The heat exchanger according to claim 17, wherein said retaining wall is an inlet retaining wall, in which said outlet cap assembly further comprises an outlet retaining wall having a first side and a second side, and has therethrough at least one gas tube outlet orifice, said at least one gas tube outlet orifice being capable of directing gas from the at least one elongated gas tube from the first side toward the second side of said outlet retaining wall and into the gas outlet coupler.

19. The heat exchanger according to claim 16, in which the outlet cap assembly and the inlet cap assembly are interchangeable.

20. The heat exchanger according to claim 1, in which the annular coolant chamber extends around the entire circumference of the tubular housing.

21. The heat exchanger according to claim 1, in which the annular coolant chamber extends around less than the entire circumference of the tubular housing.

22. The heat exchanger according to claim 1, in which the one or more coolant intake apertures are prepositioned in locations that optimally distribute liquid coolant within said cavity of said tubular housing.

23. A heat exchanger for cooling heated gas using liquid coolant, said heat exchanger comprising:
a tubular housing having a front end, a central portion, and a rear end, and including a coolant distribution portion that is substantially proximate to the front end, said coolant distribution portion having both an inner surface and an outer surface, said central portion having a first radius, said coolant distribution portion having at least a second radius, wherein the second radius is larger than the first radius, said tubular housing having one or more walls that at least partially define a cavity;
a tube retention cap sealedly engaged proximate to the front end of the tubular housing, said tube retention cap including at least one gas tube orifice;
a distribution insert having at least one wall defining an inner surface and an outer surface, and including one or more coolant intake apertures spaced around its circumference, said distribution insert positioned within the coolant distribution portion of the tubular housing, to create a space between the outer surface of said distribution insert and the inner surface of said coolant distribution portion forming an annular coolant chamber, said annular coolant chamber adapted to distribute liquid coolant around and through the one or more coolant intake apertures, into the cavity of the tubular housing;
a coolant inlet integrated with the annular coolant chamber, said coolant inlet adapted to receive liquid coolant and to, in turn, direct liquid coolant into and through the annular coolant chamber;
at least one elongated gas tube sealedly engaged with and extending from the at least one gas tube orifice into the cavity of the tubular housing toward said rear end, said at least one elongated gas tube capable of being immersed in liquid coolant positioned within said cavity to facilitate an exchange of heat from heated gas into liquid coolant;
a gas inlet coupler at the front end of said tubular housing, said gas inlet coupler sealedly covering the front end of said tubular housing over said tube retention cap, said gas inlet coupler adapted to receive heated gas and to direct heated gas through said at least one gas tube orifice and into the at least one elongated gas tube;
a coolant outlet disposed substantially proximate the rear end of the tubular housing, said coolant outlet adapted to receive liquid coolant from within the cavity and to release liquid coolant from the cavity of the tubular housing; and
a gas outlet coupler at said rear end of the tubular housing, said gas outlet coupler adapted to direct cooled gas from the at least one elongated gas tube.

24. A method of forming a heat exchanger for cooling heated gas using liquid coolant, the method comprising:
providing a tubular housing having a front end and a rear end, an inner periphery and an outer periphery, said outer periphery defining a circumference about the tubular housing, and a liquid coolant cavity therewithin;
providing a series of elongated gas tubes extending through said liquid coolant cavity; and
providing an annular coolant inlet chamber by positioning a sleeve having an inner surface, said inner surface and said outer periphery of said tubular housing collectively forming said annular coolant inlet chamber about at least a portion of the circumference about the tubular housing proximate the front end,
wherein the heat exchanger is configured so as to be capable of:
distributing liquid coolant through multiple locations from within said annular coolant inlet chamber for entry into the liquid coolant cavity from the front end to the rear end;
directing heated gas into the series of elongated gas tubes from the front end to the rear end;
exchanging heat from said elongated gas towards and into the liquid coolant; and
directing cooled gas from the rear end of the tubular housing for subsequent use thereof.

25. The method according to claim 24, wherein said multiple locations comprise one or more coolant intake apertures spaced between the annular coolant inlet chamber and the liquid coolant cavity, and wherein the heat exchanger is further configured so as to be capable of:
directing the liquid coolant from within the annular coolant inlet chamber through the one or more coolant intake apertures and into the liquid coolant cavity of the tubular housing.

26. The method according to claim 25, wherein the coolant intake apertures are formed about said outer periphery of the tubular housing proximate the front end.

27. The method according to claim 25, wherein the method further comprises:
providing a distribution insert having an inner periphery and an outer periphery, said distribution insert being positioned within the tubular housing proximate its front end, wherein the coolant intake apertures are formed about said outer periphery of the distribution insert, and wherein a portion of the tubular housing and the distribution insert collectively form the annular coolant inlet chamber.

28. The method according to claim 24, wherein the method further comprises:
providing an annular coolant outlet chamber proximate the rear end of the tubular housing,
wherein the heat exchanger is further configured so as to be capable of:
collecting warmed liquid coolant from said liquid coolant cavity and directing the warmed liquid coolant into the annular coolant outlet chamber.

29. The method according to claim 28, wherein the annular coolant inlet chamber and the annular coolant outlet chamber are interchangeable.

30. The method according to claim 28, wherein the tubular housing, the annular coolant inlet chamber, and the annular coolant outlet chamber are all formed from one or more stamped pieces of metal.

31. The method according to claim 24, wherein the method further comprises:
forming the tubular housing from one or more pieces of metal through a process of extrusion.

32. The method according to claim 24, wherein the method further comprises:
forming the series of elongated gas tubes from one or more pieces of metal through a process of extrusion.

33. The method according to claim 24, wherein at least one of the tubular housing and the series of elongated gas tubes are each formed from a welded strip of turned metal.

34. A method of cooling heated gas in a heat exchanger having a tubular housing with a front end and a rear end, an inner periphery and an outer periphery, said outer periphery defining a circumference about the tubular housing, wherein the heat exchanger also includes a gas inlet coupler, an annular coolant chamber surrounding at least a portion of the tubular housing circumference, one or more elongated gas tubes, a cavity at least partially formed by the tubular housing, a coolant distribution portion substantially proximate the front end of said tubular housing, a plurality of coolant intake apertures circumferentially spaced around the coolant distribution portion of the tubular housing, one or more egress apertures disposed substantially proximate the rear end of the tubular housing, and a gas outlet coupler, the method comprising:

providing heated gas into the gas inlet coupler of the heat exchanger, said gas inlet coupler sealedly covering the front end of said tubular housing;

directing the heated gas into the at least one elongated gas tube that extends into the cavity at least partially defined by inner walls of the tubular housing;

providing liquid coolant into the annular coolant chamber surrounding at least portion of the tubular housing, said annular coolant chamber surrounding the coolant distribution portion of the tubular housing;

distributing the liquid coolant around the plurality of coolant intake apertures;

directing the liquid coolant through the plurality of coolant intake apertures and into the cavity of the tubular housing to, in turn, immerse the at least one elongated gas tube in the liquid coolant, wherein the liquid coolant is in contact with an outer surface of the at least one elongated gas tube, to facilitate the transfer of heat from the heated gas within the at least one elongated gas tube, into the liquid coolant, to produce cooled gas and warmed liquid coolant;

directing the warmed liquid coolant through the one or more egress apertures to, in turn, release the warmed liquid coolant from the cavity of the tubular housing; and directing the cooled gas from the at least one elongated gas tube into the gas outlet coupler.

35. A heat exchanger for cooling heated gas using liquid coolant, said heat exchanger comprising:

a tubular housing having a front end, a rear end and an outer wall, said tubular housing including two or more coolant intake apertures circumferentially spaced within a coolant distribution portion of the tubular housing that is substantially proximate the front end, said tubular housing having one or more walls that at least partially define a cooling cavity;

a tube retention cap sealedly engaged proximate to the front end of the tubular housing, said tube retention cap including at least one gas tube orifice;

a sleeve having an inner wall sealedly positioned about said coolant distribution portion of the tubular housing;

an annular coolant chamber formed by the inner wall of said sleeve and the outer wall of said tubular housing, said annular coolant chamber surrounding said coolant distribution portion of the tubular housing, said annular coolant chamber adapted to distribute liquid coolant around the two or more coolant intake apertures and to, in turn, direct liquid coolant around and through the two or more coolant intake apertures into the cooling cavity of the tubular housing;

a coolant inlet integrated with the annular coolant chamber, said coolant inlet adapted to receive liquid coolant and to, in turn, direct liquid coolant into and through the annular coolant chamber;

at least one elongated gas tube sealedly engaged with and extending from the at least one gas tube orifice into the cooling cavity of the tubular housing toward said rear end, said at least one elongated gas tube capable of being immersed in liquid coolant positioned within said cooling cavity to facilitate an exchange of heat from heated gas into liquid coolant;

a gas inlet coupler at the front end of said tubular housing, said gas inlet coupler positioned proximate the front end of said tubular housing over said tube retention cap, said gas inlet coupler adapted to receive heated gas and to direct heated gas through said at least one gas tube orifice and into the at least one elongated gas tube;

a coolant outlet disposed substantially proximate the rear end of the tubular housing, said coolant outlet adapted to receive liquid coolant from within the cooling cavity and to release liquid coolant from the cooling cavity of the tubular housing; and a gas outlet coupler at said rear end of the tubular housing, said gas outlet coupler adapted to direct cooled gas from the at least one elongated gas tube.

\* \* \* \* \*